(12) United States Patent
Takahashi

(10) Patent No.: US 11,828,964 B2
(45) Date of Patent: Nov. 28, 2023

(54) LIGHT CONTROL SHEET AND METHOD OF PRODUCING LIGHT CONTROL SHEET

(71) Applicant: TOPPAN PRINTING CO., LTD., Tokyo (JP)

(72) Inventor: Masayuki Takahashi, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/206,733

(22) Filed: Mar. 19, 2021

(65) Prior Publication Data
US 2021/0208321 A1    Jul. 8, 2021

Related U.S. Application Data

(63) Continuation of application No. PCT/JP2019/036825, filed on Sep. 19, 2019.

(30) Foreign Application Priority Data

Sep. 19, 2018  (JP) ................................ 2018-175065

(51) Int. Cl.
*G02B 5/30* (2006.01)
*E06B 9/24* (2006.01)

(52) U.S. Cl.
CPC .............. *G02B 5/3016* (2013.01); *E06B 9/24* (2013.01); *E06B 2009/2464* (2013.01)

(58) Field of Classification Search
CPC ........ G02F 1/1345; G02F 1/13; G02F 1/1343; G02F 1/1334; E06B 2009/2464; E06B 9/24; G02B 5/3016
See application file for complete search history.

(56) References Cited

U.S. PATENT DOCUMENTS

| 5,706,069 A * | 1/1998 | Hermens ............... G02F 1/1345 349/153 |
| 2008/0002134 A1* | 1/2008 | Jeong .................... G02F 1/1339 349/153 |

(Continued)

FOREIGN PATENT DOCUMENTS

| JP | H02-158717 A | 6/1990 |
| JP | 3-290337 A | 12/1991 |

(Continued)

OTHER PUBLICATIONS

International Search Report dated Nov. 26, 2019 in PCT/JP2019/036825, filed Sep. 19, 2019, (with English Translation).

(Continued)

*Primary Examiner* — Mariam Qureshi
(74) *Attorney, Agent, or Firm* — Oblon, McClelland, Maier & Neustadt, L.L.P.

(57) ABSTRACT

A light control sheet includes a light control layer including a liquid crystal composition, a pair of transparent electrode layers including a first transparent electrode layer and a second transparent electrode layer sandwiching the light control layer, and a pair of transparent support layers sandwiching the light control layer and the pair of transparent electrode layers. The first transparent electrode layer includes an electrode section for an application of a driving voltage and an insulating section which is adjacent to the electrode section in a direction parallel to a surface of the light control sheet and extends along an outer edge of the electrode section in a plan view perpendicular to the surface.

20 Claims, 12 Drawing Sheets

(56) References Cited

U.S. PATENT DOCUMENTS

| | | | |
|---|---|---|---|
| 2012/0161616 A1 | 6/2012 | Yamagishi et al. | |
| 2016/0054633 A1* | 2/2016 | Brown | G01N 21/59 359/275 |
| 2016/0138328 A1 | 5/2016 | Behmke et al. | |
| 2018/0011359 A1* | 1/2018 | De Jong | B60J 3/04 |
| 2018/0101079 A1* | 4/2018 | Tonar | G02F 1/1503 |
| 2018/0281570 A1* | 10/2018 | Labrot | B32B 17/10036 |

FOREIGN PATENT DOCUMENTS

| | | |
|---|---|---|
| JP | 2006-501524 A | 1/2006 |
| JP | 2008-276057 A | 11/2008 |
| JP | 2017-187775 A | 10/2017 |
| JP | 2018-507471 A | 3/2018 |
| JP | 2018-115382 A | 7/2018 |
| WO | WO 2014/171470 A1 | 10/2014 |
| WO | WO 2017/157626 A1 | 9/2017 |

OTHER PUBLICATIONS

Extended European Search Report dated Oct. 5, 2021 in corresponding European Patent Application No. 19863196.2, 10 pages.
Office Action dated Mar. 22, 2022 in corresponding Japanese Patent Application No. 2020-548617 (with English-language Translation), 13 pages.
Japanese Office Action dated Jul. 26, 2022 in Japanese Patent Application No. 2020-548617 (with English translation), 4 pages.
Office Action dated Jul. 11, 2023 in corresponding Japanese Patent Application No. 2022-176585, filed Nov. 2, 2022 (with English-language Translation), 8 pages.

* cited by examiner

LIGHT CONTROL SHEET AND METHOD OF PRODUCING LIGHT CONTROL SHEET

CROSS-REFERENCE TO RELATED APPLICATIONS

The present application is a continuation of International Application No. PCT/JP2019/036825, filed Sep. 19, 2019, which is based upon and claims the benefits of priority to Japanese Application No. 2018-175065, filed Sep. 19, 2018. The entire contents of all of the above applications are incorporated herein by reference.

BACKGROUND OF THE INVENTION

Field of the Invention

The present invention relates to a light control sheet that has a light control region having a variable light transmittance, and a method of producing the light control sheet.

Discussion of the Background

A light control sheet includes a light control layer that contains a liquid crystal composition and a pair of transparent electrode layers that sandwich the light control layer. When an alignment state of liquid crystal molecules varies according to a potential difference between the pair of transparent electrode layers, a light transmittance of the light control sheet varies (see, for example, JP 2017-187775 A).

SUMMARY OF THE INVENTION

According to an aspect of the present invention, a light control sheet includes a light control layer including a liquid crystal composition, a pair of transparent electrode layers including a first transparent electrode layer and a second transparent electrode layer sandwiching the light control layer, and a pair of transparent support layers sandwiching the light control layer and the pair of transparent electrode layers. The first transparent electrode layer includes an electrode section for an application of a driving voltage and an insulating section which is adjacent to the electrode section in a direction parallel to a surface of the light control sheet and extends along an outer edge of the electrode section in a plan view perpendicular to the surface.

According to another aspect of the present invention, a method of producing a light control sheet includes forming a multilayer laminate in which a light control layer including a liquid crystal composition is sandwiched between a first transparent conductive layer supported by a first transparent support layer and a second transparent conductive layer supported by a second transparent support layer, and forming an insulating section in the first transparent conductive layer by laser irradiation to the multilayer laminate such that a layer including an electrode section for an application of a driving voltage and the insulating section extending along an outer edge of the electrode section is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
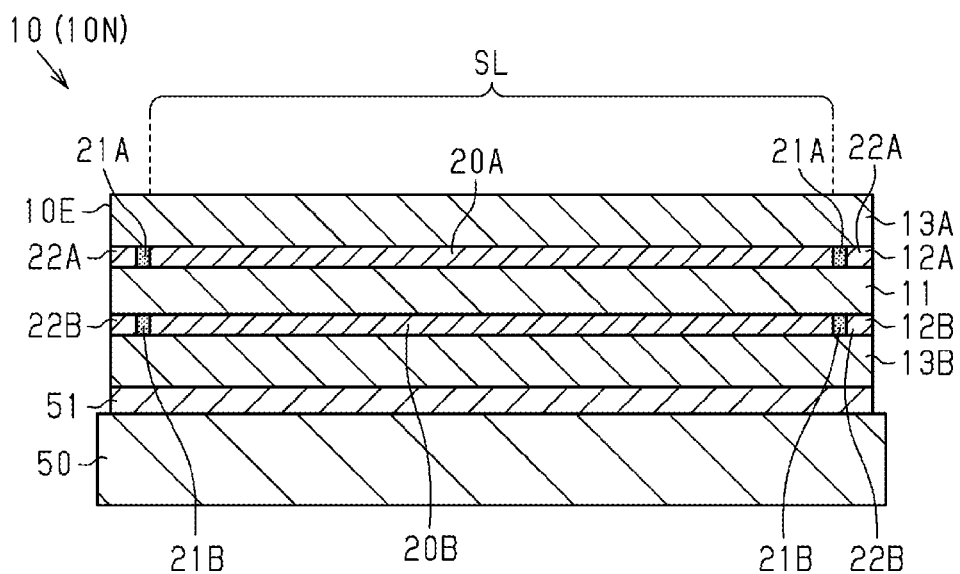
FIG. 1 shows a cross-sectional structure of a normal-type light control sheet according to a first embodiment of a light control sheet.

The embodiments will now be described with reference to the accompanying drawings, wherein like reference numerals designate corresponding or identical elements throughout the various drawings.

First Embodiment

A first embodiment of a light control sheet and a method of producing the light control sheet will be described with reference to FIGS. 1 to 17. A light control sheet 10 of the first embodiment has either a normal-type structure or a reverse-type structure. FIG. 1 shows a cross-sectional structure of a normal-type light control sheet 10N.

<Configuration of Light Control Sheet>

As shown in FIG. 1, the normal-type light control sheet 10N includes a light control layer 11, a first transparent electrode layer 12A and a second transparent electrode layer 12B which are a pair of transparent electrode layers, and a first transparent support layer 13A and a second transparent support layer 13B which are a pair of transparent support layers. The first transparent electrode layer 12A and the second transparent electrode layer 12B sandwich the light control layer 11, and the first transparent support layer 13A and the second transparent support layer 13B sandwich the light control layer 11 and the transparent electrode layers 12A and 12B. The first transparent support layer 13A supports the first transparent electrode layer 12A, and the second transparent support layer 13B supports the second transparent electrode layer 12B. All the above layers constituting the light control sheet 10N extend to an edge surface 10E of the light control sheet 10N.

The light control sheet 10N is attached to a transparent plate 50. Specifically, a back surface of the light control sheet 10N is bonded to a surface of the transparent plate 50 via a transparent adhesive layer 51. The back surface of the light control sheet 10N is a surface of the second transparent support layer 13B facing away from the second transparent electrode layer 12B. The transparent plate 50 is a transparent plate-shaped member composed of glass, resin, or the like. The transparent plate 50 may have a single-layer structure or a multilayer structure. The surface of the transparent plate 50 may be a flat surface or a curved surface. Specifically, the transparent plate 50 may be, for example, a construction material such as a window glass or a glass wall, or may be a vehicle member such as a window glass for an automobile.

The first transparent electrode layer 12A has an electrode section 20A, insulating sections 21A, and outer-peripheral conductive sections 22A. The electrode section 20A is located in a region including a central portion of the first transparent electrode layer 12A in a surface direction. The surface direction is a direction in which the layers extend, in other words, a direction along a surface of the light control sheet 10. Each of the outer-peripheral conductive sections 22A is located at an edge section of the first transparent electrode layer 12A in the surface direction, and each of edge surface of the outer-peripheral conductive sections 22A constitutes a part of the edge surface 10E of the light control sheet 10N. Each of the insulating section 21A is adjacent to the electrode section 20A and each of the outer-peripheral conductive sections 22A and is sandwiched between the electrode section 20A and each of the outer-peripheral conductive sections 22A. That is, each of the outer-peripheral conductive section 22A, the insulating section 21A, and the electrode section 20A is located in this order along the surface direction from the edge surface 10E. The outer-peripheral conductive sections 22A and the insulating sections 21A are arranged to overlap the light control layer 11 as viewed from a position facing the surface of the light control sheet 10N.

As with the first transparent electrode layer 12A, the second transparent electrode layer 12B has an electrode section 20B, insulating sections 21B, and outer-peripheral conductive sections 22B. The electrode section 20B is located in a region including a central portion of the second transparent electrode layer 12B in the surface direction. Each of the outer-peripheral conductive sections 22B is located at an edge section of the second transparent electrode layer 12B in the surface direction, and each of edge surface of the outer-peripheral conductive sections 22B constitutes a part of the edge surface 10E of the light control sheet 10N. Each of the insulating sections 21B is adjacent to an electrode section 20B and an outer-peripheral conductive section 22B and is sandwiched in the surface direction between an electrode section 20B and an outer-peripheral conductive sections 22B.

When a driving voltage is applied to the electrode sections 20A and 20B, the electrode sections 20A and 20B function as electrodes that sandwich the light control layer 11. The insulating sections 21A and 21B have insulation properties, and the outer-peripheral conductive sections 22A and 22B have conductivity. The outer-peripheral conductive sections 22A are insulated from the electrode section 20A by interposition of the insulating sections 21A, and the outer-peripheral conductive sections 22B are insulated from the electrode section 20B by interposition of the insulating sections 21B. That is, no driving voltage is applied to the outer-peripheral conductive sections 22A and 22B.

The electrode section 20A and the electrode section 20B face each other with the light control layer 11 interposed therebetween. The insulating sections 21A and the insulating sections 21B face each other with the light control layer 11 interposed therebetween. The outer-peripheral conductive sections 22A and the outer-peripheral conductive sections 22B face each other with the light control layer 11 interposed therebetween. In plan view of the surface of the light control sheet 10N, a region in which the electrode section 20A is located matches a region in which the electrode section 20B is located, except for regions in which the electrode sections 20A and 20B are connected to wiring sections. In plan view, a region in which the insulating sections 21A are located matches a region in which the insulating sections 21B are located, and a region in which the outer-peripheral conductive sections 22A are located matches a region in which the outer-peripheral conductive sections 22B are located.

In a region of the light control sheet 10N in plan view, a region in which the light control layer 11 is sandwiched between the electrode section 20A and the electrode section 20B is a light control region SL that has a variable light transmittance. In the normal type, when a driving voltage is applied to the electrode sections 20A and 20B, liquid crystal molecules contained in the light control layer 11 are aligned, and major axes of the liquid crystal molecules are oriented in the direction of an electric field between the electrode sections 20A and 20B. As a result, the light control layer 11 is more likely to transmit light, and thus the light control region SL becomes transparent. On the other hand, when no driving voltage is applied to the electrode sections 20A and 20B, the major axes of the liquid crystal molecules are irregularly oriented. Thus, light incident on the light control layer 11 is scattered. As a result, the light control region SL becomes whitish and opaque.

Figure 2:
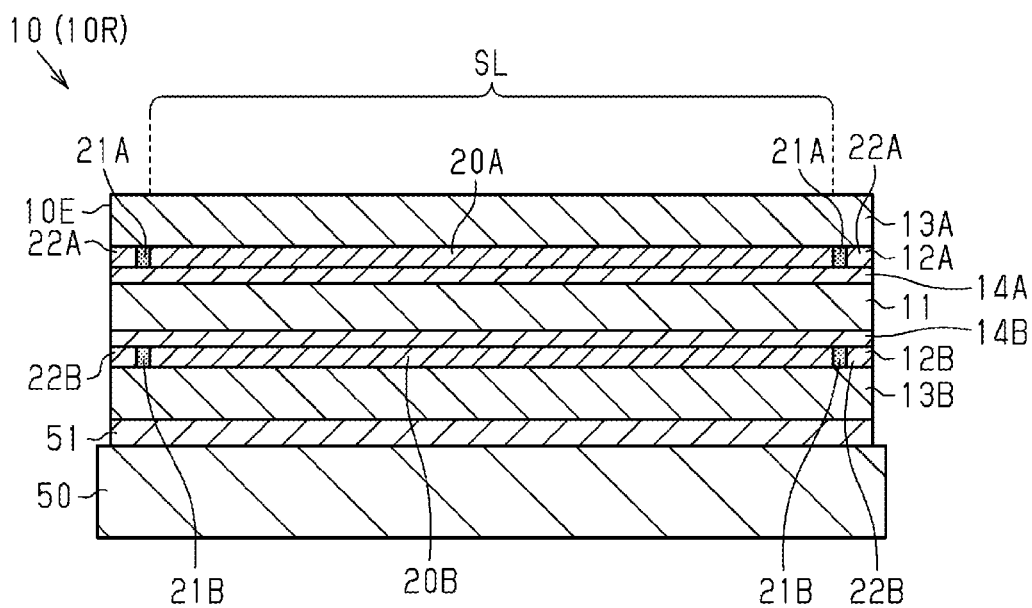
FIG. 2 shows a cross-sectional structure of a reverse-type light control sheet according to the first embodiment of the light control sheet.

FIG. 2 shows a cross-sectional structure of a reverse-type light control sheet 10R. In addition to the light control layer 11, the transparent electrode layers 12A and 12B, and the transparent support layers 13A and 13B, the reverse-type light control sheet 10R includes a first alignment layer 14A and a second alignment layer 14B which are a pair of alignment layers that sandwich the light control layer 11. The first alignment layer 14A is located between the light control layer 11 and the first transparent electrode layer 12A, and the second alignment layer 14B is located between the light control layer 11 and the second transparent electrode layer 12B. The first transparent electrode layer 12A and the second transparent electrode layer 12B have the same configurations as in the normal-type light control sheet.

The alignment layers 14A and 14B are, for example, vertical alignment films. When the first transparent electrode layer 12A and the second transparent electrode layer 12B are equipotential, the alignment layers 14A and 14B align the liquid crystal molecules contained in the light control layer 11 so that the major axes of the liquid crystal molecules are oriented along a normal direction of the alignment layers 14A and 14B. When a potential difference is generated between the transparent electrode layers 12A and 12B, the alignment layers 14A and 14B allow the directions of the major axes of the liquid crystal molecules contained in the light control layer 11 to be changed to directions other than the normal direction.

In the reverse type, when a driving voltage is applied to the electrode sections 20A and 20B, the major axes of the liquid crystal molecules contained in the light control layer 11 are oriented in directions different from the normal direction of the alignment layers 14A and 14B, and thus the light control region SL becomes opaque. When no driving voltage is applied to the electrode sections 20A and 20B, the major axes of the liquid crystal molecules are oriented along the normal direction of the alignment layers 14A and 14B, and thus the light control region SL becomes transparent.

Figure 3:
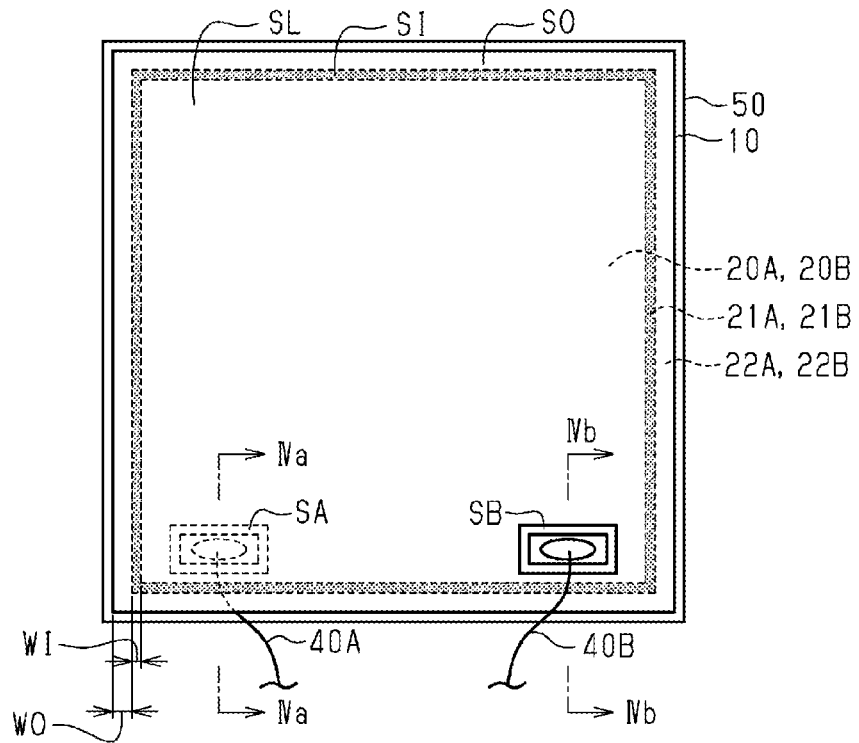
FIG. 3 shows a planar structure of the light control sheet according to the first embodiment.

The normal type light control sheet 10 and the reverse type light control sheet 10 have the same planar structure. FIG. 3 is a plan view of the light control sheet 10 attached to the transparent plate 50, and indicates, by dots, a region in which the insulating sections 21A and 21B are located.

As shown in FIG. 3, in plan view of the surface of the light control sheet 10, the region in which the insulating sections 21A and 21B are located is an insulating region SL, and a region in which the outer-peripheral conductive sections 22A and 22B are located is a conductive region SO. In plan view, the insulating region SI is located outside the light control region SL and extends along an outer edge of the light control region SL. Furthermore, the conductive region SO is located outside the insulating region SI and extends along an outer edge of the insulating region SI. The insulating region SI has an annular shape that surrounds the entire light control region SL, and the conductive region SO has an annular shape that surrounds the entire light control region SL and insulating region SI. The insulating sections 21A and 21B are configured such that sections having insulation properties are continuously arranged in the direction in which the insulating region SI extends.

In plan view, the conductive region SO preferably has a width WO of 1 mm or more and 10 mm or less. If the width WO is 1 mm or more, the conductive region SO is not excessively thin, and thus the outer-peripheral conductive sections 22A and 22B are easily formed. Furthermore, the conductive region SO having a width WO of 1 mm or more provides sufficient adhesive force of the outer-peripheral conductive section 22A to the layers adjacent to the transparent electrode layer 12A in a thickness direction and sufficient adhesive force of the outer-peripheral conductive section 22B to the layers adjacent to the transparent electrode layer 12B in the thickness direction. If the width WO is 10 mm or less, the light control region SL is prevented from being small. If a length of the conductive region SO in a width direction is not constant, the width WO is an average length of the conductive region SO in the width direction.

The insulating region SI preferably has a width WI that is equal to or less than the width WO of the conductive region SO. If the width WI is equal to or less than the width WO, the light control region SL is prevented from being small. In order to obtain high insulation properties due to the insulating sections 21A and 21B, the width WI of the insulating region SI is preferably 5 μm or more. If a length of the insulating region SI in the width direction is not constant, the width WI is an average length of the insulating region SI in the width direction.

In plan view, in a region surrounded by the insulating region SI, the light control sheet 10 has the light control region SL, a first connection region SA for connecting the electrode section 20A of the first transparent electrode layer 12A to a drive circuit, and a second connection region SB for connecting the electrode section 20B of the second transparent electrode layer 12B to the drive circuit. In the region surrounded by the insulating region SI, a region other than the connection regions SA and SB is the light control region SL.

In the region surrounded by the insulating region SI, the connection regions SA and SB may be apart from the insulating region SI or may be in contact with the insulating region SI. FIG. 3 shows an example in which the connection regions SA and SB are apart from the insulating region SI. In other words, each of the first connection region SA and the second connection region SB is surrounded by the light control region SL. The configuration in which the connection regions SA and SB are apart from the insulating region SI does not require high accuracy in alignment of the connection regions SA and SB with the insulating region SI; thus, the connection regions SA and SB and the insulating region SI are easily formed. A positional relationship between the first connection region SA and the second connection region SB is not particularly limited, and for example, the first connection region SA and the second connection region SB may be arranged in a direction along a side of the light control sheet 10 having a rectangular shape.

The first connection region SA is connected to a first wiring section 40A, and the second connection region SB is connected to a second wiring section 40B. The electrode section 20A of the first transparent electrode layer 12A is connected to the drive circuit through the first wiring section 40A, and the electrode section 20B of the second transparent electrode layer 12B is connected to the drive circuit through the second wiring section 40B. The drive circuit converts a voltage received from a power supply into a driving voltage, and applies the driving voltage to the electrode sections 20A and 20B through the wiring sections 40A and 40B, respectively.

Structures in the vicinity of the connection regions SA and SB will be described with reference to FIG. 4. FIG. 4 shows examples of structures of the normal-type light control sheet 10N.

Figure 4A:
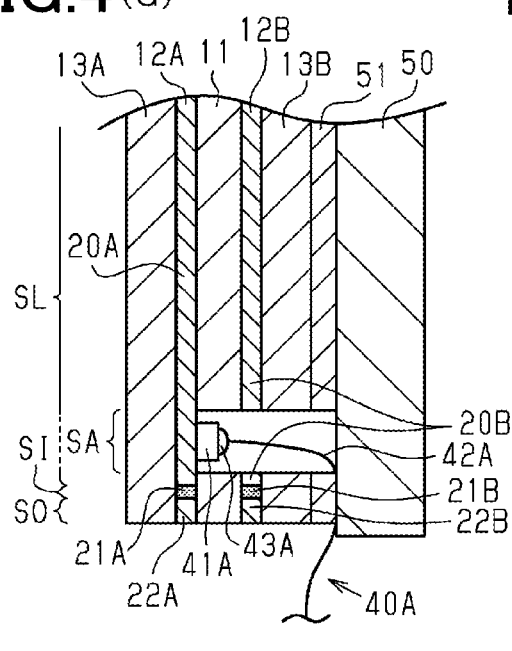
FIG. 4 (a) shows a cross-sectional structure taken along line IVa-IVa in FIG. 3, and FIG. 4 (b) shows a cross-sectional structure taken along line IVb-IVb in FIG. 3.
Figure 4B:
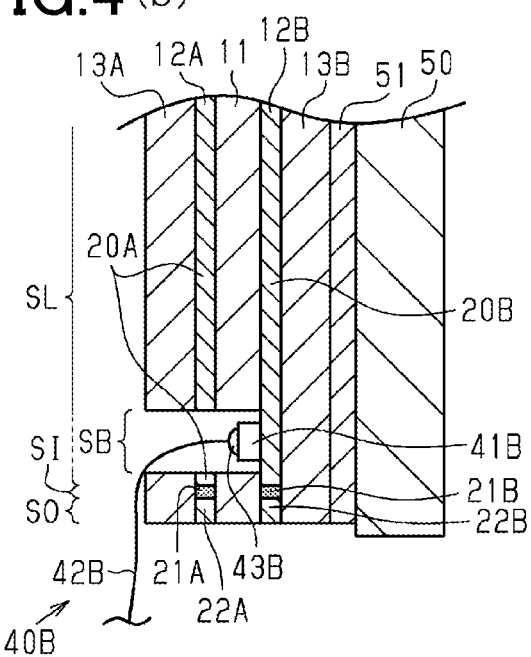

As shown in FIG. 4(a), in the first connection region SA, a surface of the first transparent electrode layer 12A facing away from the first transparent support layer 13A is exposed from other layers of the light control sheet 10, which include the light control layer 11, the second transparent electrode layer 12B, and the second transparent support layer 13B, and facing to the transparent plate 50. A surface of the first transparent support layer 13A facing away from the first transparent electrode layer 12A is a surface of the light control sheet 10.

The first transparent electrode layer 12A is continuous between the light control region SL and the first connection region SA, and the electrode section 20A is located in both the light control region SL and the first connection region SA. In the first connection region SA, the first wiring section 40A is connected to the electrode section 20A.

The first wiring section 40A only needs to be configured to allow electrical conduction between the electrode section 20A and the drive circuit. For example, the first wiring section 40A includes a conductive adhesive layer 41A, a lead 42A, and a solder section 43A. The conductive adhesive layer 41A is composed of, for example, a conductive tape such as a copper tape. The conductive adhesive layer 41A is bonded to a surface of the electrode section 20A in the first connection region SA, and the lead 42A is fixed to a surface of the conductive adhesive layer 41A via the solder section 43A.

As shown in FIG. 4 (b), in the second connection region SB, a surface of the second transparent electrode layer 12B facing away the second transparent support layer 13B is exposed from other layers of the light control sheet 10, which include the light control layer 11, the first transparent electrode layer 12A, and the first transparent support layer 13A, and constitutes the outermost surface of the light control sheet 10. A surface of the second transparent support layer 13B facing away from the second transparent electrode layer 12B is in contact with the transparent adhesive layer 51.

The second transparent electrode layer 12B is continuous between the light control region SL and the second connection region SB, and the electrode section 20B is located in both the light control region SL and the second connection region SB. In the second connection region SB, the second wiring section 40B is connected to the electrode section 20B.

The second wiring section 40B only needs to be configured to allow electrical conduction between the electrode section 20B and the drive circuit. For example, as with the first wiring section 40A, the second wiring section 40B includes a conductive adhesive layer 41B, a lead 42B, and a solder section 43B. The conductive adhesive layer 41B is bonded to a surface of the electrode section 20B in the second connection region SB, and the lead 42B is fixed to a surface of the conductive adhesive layer 41B via the solder section 43B.

<Method of Producing Light Control Sheet>

A method of producing the light control sheet 10 will be described by using an example of the normal type light control sheet 10N.

Figure 5:
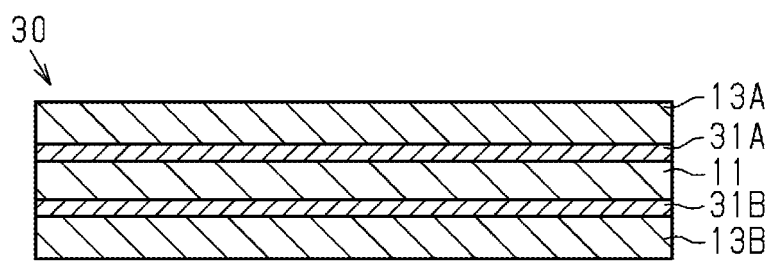
FIG. 5 shows a process of producing the light control sheet of the first embodiment, and shows a formed multilayer laminate.

As shown in FIG. 5, first, a multilayer laminate 30 that includes the light control layer 11, transparent conductive layers 31A and 31B, and the transparent support layers 13A and 13B is formed. The first transparent conductive layer 31A is supported by the first transparent support layer 13A, and the second transparent conductive layer 31B is supported by the second transparent support layer 13B. The first transparent conductive layer 31A and the second transparent conductive layer 31B sandwich the light control layer 11. The transparent conductive layer 31A is the transparent electrode layer 12A in which the electrode section 20A, the insulating section 21A, and the outer-peripheral conductive section 22A are not yet formed, and the transparent conductive layer 31B is the transparent electrode layer 12B in which the electrode section 20B, the insulating section 21B, and the outer-peripheral conductive section 22B are not yet formed. The transparent conductive layers 31A and 31B are a transparent uniform conductive film including no section having insulation properties.

The multilayer laminate 30 is, for example, cut out from a large sheet including a laminate of the light control layer 11, the transparent conductive layers 31A and 31B, and the transparent support layers 13A and 13B, and is formed into a desired shape corresponding to an object to which the light control sheet 10 is to be bonded.

The light control layer 11 contains a liquid crystal composition. The light control layer 11 is composed of, for example, a polymer network liquid crystal (PNLC), a polymer dispersed liquid crystal (PDLC), a nematic curvilinear aligned phase (NCAP) liquid crystal, or the like. For example, a polymer network liquid crystal has a three-dimensional mesh polymer network, and holds liquid crystal molecules in voids in the polymer network. The liquid crystal molecules contained in the light control layer 11 have, for example, positive dielectric anisotropy, and have a higher dielectric constant in a major axis direction of the liquid crystal molecules than in a minor axis direction of the liquid crystal molecules. These liquid crystal molecules are, for example, liquid crystal molecules based on Schiff base, azo, azoxy, biphenyl, terphenyl, benzoic acid ester, tolan, pyrimidine, cyclohexanecarboxylic acid ester, phenylcyclohexane, or dioxane molecules.

The light control layer 11 may include a dye that has a predetermined color and does not hinder movement of the liquid crystal molecules according to a magnitude of the voltage applied to the light control layer 11. Such a configuration achieves the light control region SL having a predetermined color.

Materials forming the transparent conductive layers 31A and 31B include, for example, polymers including indium tin oxide (ITO), fluorine-doped tin oxide (FTO), tin oxide, zinc oxide, carbon nanotube (CNT), or poly(3,4-ethylenedioxythiophene) (PEDOT), and multilayer films including Ag alloy thin films.

The first transparent support layer 13A and the second transparent support layer 13B are transparent substrates. Example of the transparent support layers 13A and 13B include a glass substrate, a silicon substrate, or a polymer film made of polyethylene, polystyrene, polyethylene terephthalate, polyvinyl alcohol, polycarbonate, polyvinyl chloride, polyimide, polysulfone, cycloolefin polymer, triacetylcellulose, or the like.

Then, the multilayer laminate 30 is irradiated with a laser beam to form the insulating sections 21A and 21B. Subsequently, the transparent electrode layers 12A and 12B are formed.

Figure 6:
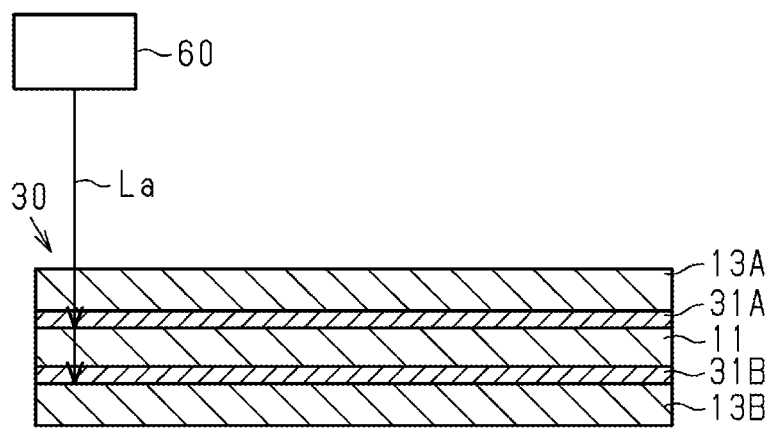
FIG. 6 shows the process of producing the light control sheet of the first embodiment, and shows an example of a laser irradiation step.

Specifically, as shown in FIG. 6, a region of the multilayer laminate 30 that is to be the insulating region SI is irradiated with a laser La from a side on which the first transparent conductive layer 31A is located with respect to the light control layer 11. By irradiation with the laser La, an insulating region is formed in the two transparent conductive layers 31A and 31B, i.e., in both the first transparent conductive layer 31A which is closer to a light source of the laser device 60 and the second transparent conductive layer 31B which is farther from the light source. Thus, the insulating section 21A, and the electrode section 20A and the outer-peripheral conductive section 22A that are divided by the insulating section 21A are formed in the first transparent conductive layer 31A. As a result, the first transparent electrode layer 12A is formed. Furthermore, the insulating section 21B, and the electrode section 20B and the outer-peripheral conductive section 22B that are divided by the insulating section 21B are formed in the second transparent conductive layer 31B. As a result, the second transparent electrode layer 12B is formed.

Specifically, the laser La is focused on the first transparent conductive layer 31A or a portion in the vicinity of the first transparent conductive layer 31A, and the multilayer laminate 30 is irradiated with the laser La from a position facing the first transparent support layer 13A so that the laser La is transmitted through the first transparent support layer 13A. At least an outer surface of the first transparent support layer 13A is not modified by the laser La, and a portion having insulation properties is formed in the first transparent conductive layer 31A, and thus the insulating section 21A is formed. Furthermore, a portion having insulation properties is formed in the second transparent conductive layer 31B by the laser La transmitted through the first transparent conductive layer 31A and the light control layer 11, and thus the insulating section 21B is formed.

The laser La may be focused on the second transparent conductive layer 31B or a portion in the vicinity of the second transparent conductive layer 31B. Furthermore, the insulating sections 21A and 21B may be formed by focusing the laser La on a position beyond the second transparent conductive layer 31B as viewed from the light source of the laser device 60 and setting a wavelength of the laser La to a wavelength at which the laser La is absorbed by the first transparent conductive layer 31A and the second transparent conductive layer 31B.

Figure 7:
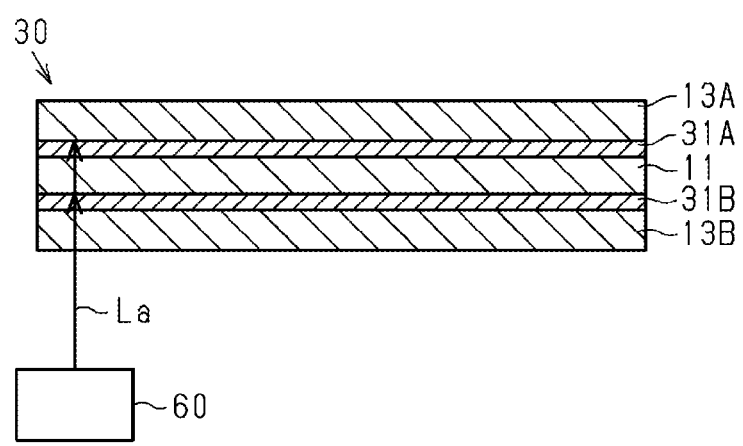
FIG. 7 shows the process of producing the light control sheet of the first embodiment, and shows an example of the laser irradiation step.

Alternatively, as shown in FIG. 7, the multilayer laminate 30 may be irradiated with the laser La from a side on which the second transparent conductive layer 31B is located with respect to the light control layer 11. Specifically, the laser La is focused on the second transparent conductive layer 31B or a portion in the vicinity of the second transparent conductive layer 31B, and the multilayer laminate 30 is irradiated with the laser La from a position facing the second transparent support layer 13B so that the laser La is transmitted through the second transparent support layer 13B. At least an outer surface of the second transparent support layer 13B is not modified by the laser La, and the insulating section 21B is formed in the second transparent conductive layer 31B. Furthermore, the insulating section 21A is formed in the first transparent conductive layer 31A by the laser La transmitted through the second transparent conductive layer 31B and the light control layer 11.

If the multilayer laminate 30 is irradiated with the laser La from a position facing the second transparent conductive layer 31B, the laser La may be focused on the first transparent conductive layer 31A or a portion in the vicinity of the first transparent conductive layer 31A. Furthermore, the insulating sections 21A and 21B may be formed by focusing the laser La on a position beyond the first transparent conductive layer 31A as viewed from the light source of the laser device 60 and setting the wavelength of the laser La to a wavelength at which the laser La is absorbed by the first transparent conductive layer 31A and the second transparent conductive layer 31B.

A medium and wavelength of the laser used for laser irradiation are not particularly limited. Examples of a laser that can be used include a Nd:YAG laser, Nd:YVO$_4$ laser, CO$_2$ laser, and semiconductor laser. For example, an infrared wavelength may be used for the laser wavelength. The laser may be a continuous-wave laser or a pulsed laser.

After laser irradiation, the connection regions SA and SB are formed. Thus, the light control sheet 10 is formed. The first connection region SA is formed by removing, by cutting or the like, the light control layer 11, the second transparent conductive layer 31B, and the second transparent support layer 13B from a region of the multilayer laminate 30 that is to be the first connection region SA. The second connection region SB is formed by removing, by cutting or the like, the light control layer 11, the first transparent conductive layer 31A, and the first transparent support layer 13A from a region of the multilayer laminate 30 that is to be the second connection region SB. The connection regions SA and SB may be formed before laser irradiation.

The multilayer laminate 30 used in production of the reverse-type light control sheet 10R includes the alignment layers 14A and 14B in addition to the light control layer 11, the transparent conductive layers 31A and 31B, and the transparent support layers 13A and 13B. The first alignment layer 14A is located between the light control layer 11 and the first transparent conductive layer 31A and the second alignment layer 14B is located between the light control layer 11 and the second transparent conductive layer 31B.

Materials for forming the alignment layers 14A and 14B are, for example, polyesters such as polyamide, polyimide, polycarbonate, polystyrene, polysiloxane, polyethylene terephthalate, and polyethylene naphthatate, and polyacrylates such as polymethylmethacrylate. Examples of alignment processing for the alignment layers 14A and 14B include rubbing, polarized light irradiation, and microprocessing.

The multilayer laminate 30 including the alignment layers 14A and 14B is irradiated with a laser similarly to the case of the normal type described above, and thus the first transparent electrode layer 12A and the second transparent electrode layer 12B are formed.

The light control sheet 10 may include one or more additional layers, in addition to the light control layer 11, the transparent electrode layers 12A and 12B, the transparent support layers 13A and 13B, and the alignment layers 14A and 14B. Examples of the additional layers include layers having a UV barrier function or the like, layers for protecting the light control layer 11 and the transparent electrode layers 12A and 12B, layers contributing to control of optical transparency in the light control region SL, and layers improving strength or characteristics such as heat resistance of the light control sheet 10. In the case as well where the light control sheet 10 includes one or more additional layers, laser irradiation is performed on the multilayer laminate 30, having a layer configuration corresponding to the layer configuration of the light control sheet 10, to form the first transparent electrode layer 12A and the second transparent electrode layer 12B.

The light control sheet 10 of the present embodiment has flexibility suitable for bonding to a curved surface, and can be applied to a curved surface having any shape such as a developable surface or a three-dimensional curved surface. The light control sheet 10 can be arranged along a curved surface without particular physical processing such as cutting of a part of the light control sheet 10. Thus, even if the light control sheet 10 is bent while being bonded to the curved surface, it is possible to avoid the occurrence of cracks initiated from the processed portion or the like in the light control sheet 10. Therefore, good resistance to bending is obtained.

<Configuration of Insulating Section>

A configuration of the insulating sections 21A and 21B produced by the above production method will be described in detail. As described above, the insulating sections 21A and 21B are a laser-processed region formed by laser irradiation. First, the laser-processed region will be described in detail.

Figure 8:
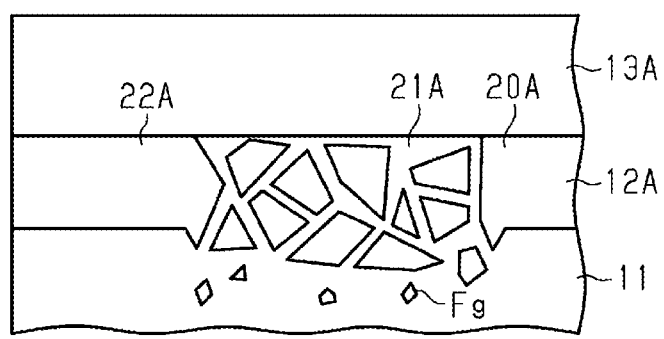
FIG. 8 shows a first example of a configuration of an insulating section in the light control sheet according to the first embodiment.
Figure 9:
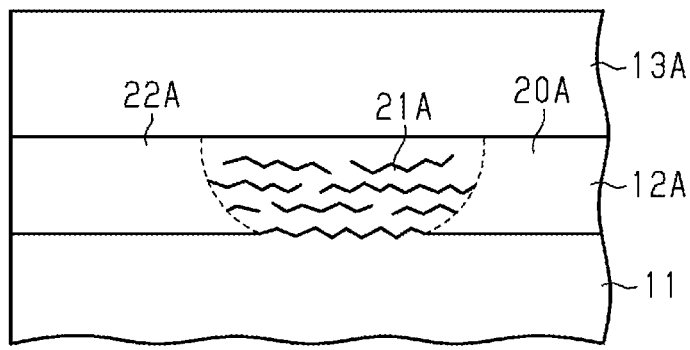
FIG. 9 shows the first example of the configuration of the insulating section in the light control sheet according to the first embodiment.

FIGS. 8 and 9 are enlarged views of a first example of a cross-sectional structure in the vicinity of the insulating section 21A. In the first example, the insulating section 21A is a section at which the conductive film constituting the first transparent conductive layer 31A is broken into small fragments. As shown in FIG. 8, in the insulating section 21A, the conductive film is fragmented into pieces by laser irradiation, and a part of the first transparent conductive layer 31A is removed from the first transparent support layer 13A. That is, the insulating section 21A is a section at which the conductive film is removed from the first transparent support layer 13A.

Fragment Fg of the conductive film removed from the first transparent support layer 13A are located at a section in the vicinity of the insulating section 21A in a functional layer such as the light control layer 11 or the first alignment layer 14A that is in contact with the first transparent electrode layer 12A. Thus, a section of the functional layer that is in contact with the insulating section 21A has a higher content of the same element as an element constituting the electrode section 20A than sections of the functional layer that are in contact with the electrode section 20A and the outer-peripheral conductive section 22A.

Further, depending on the degree of fragmentation of the conductive film due to the laser irradiation, the insulating section 21A may be a portion in which the conductive film is physically disrupted while being in contact with the first transparent support layer 13A as shown in FIG. 9. A surface of the insulating section 21A is rougher than surfaces of the electrode section 20A and the outer-peripheral conductive section 22A. In this case, the fragment Fg is not dispersed into the functional layer.

Figure 10:
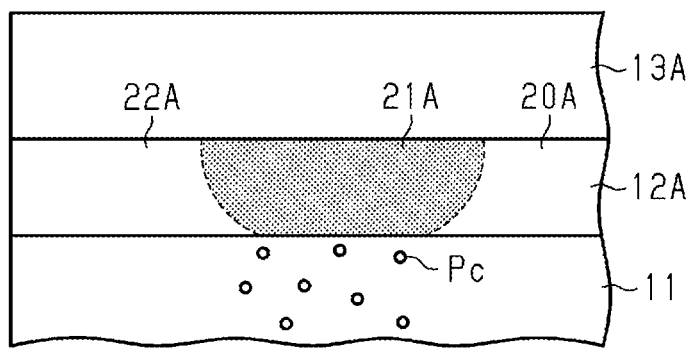
FIG. 10 shows a second example of the configuration of the insulating section in the light control sheet according to the first embodiment.
Figure 11:
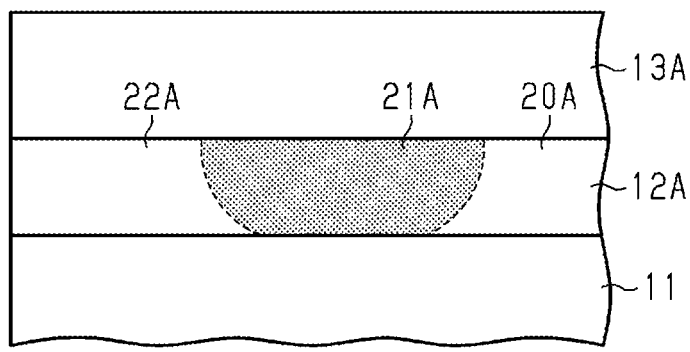
FIG. 11 shows the second example of the configuration of the insulating section in the light control sheet according to the first embodiment.

FIGS. 10 and 11 are enlarged views of a second example of the cross-sectional structure in the vicinity of the insulating section 21A. In the second example, the insulating section 21A is a region chemically modified by laser irradiation.

For example, as shown in FIG. 10, as compared with the electrode section 20A and the outer-peripheral conductive section 22A, the insulating section 21A is a region in which atoms contributing to electrical conductivity or elements Pc which are parts of molecules contributing to electrical conductivity have flowed into the layer under the first transparent electrode layer 12A, resulting in a change in composition. Such a modification in composition imparts insulating properties to the insulating section 21A.

In the functional layer such as the light control layer 11 or the first alignment layer 14A in contact with the first transparent electrode layer 12A, the section in contact with the insulating section 21A has a higher content of the element Pc than the sections of the functional layer in contact with the electrode section 20A and the outer-peripheral conductive section 22A.

The electrode section 20A, the insulating section 21A, and the outer-peripheral conductive section 22A constitute a single mutually continuous layer, and the first transparent electrode layer 12A has a flat film shape. However, since some of the elements Pc has been lost, the insulating section 21A is more fragile than the electrode section 20A and the outer-peripheral conductive section 22A. For example, the surface of the insulating section 21A is rougher than the surfaces of the electrode section 20A and the outer-peripheral conductive section 22A.

For example as shown in FIG. 11, the insulating section 21A is a region different from the electrode section 20A and the outer-peripheral conductive section 22A in that the atomic positions in the compound have been displaced or the chemical structure has changed due to breakage of bonds in molecules or the like. Such a change in chemical structure imparts insulating properties to the insulating section 21A. In the insulating section 21A, no change in composition has occurred. The electrode section 20A, the insulating section 21A, and the outer-peripheral conductive section 22A constitute a single mutually continuous layer, and the first transparent electrode layer 12A has a flat film shape.

Whether the insulating section 21A has a structure of the first example or the second example depends on the material constituting the first transparent electrode layer 12A, that is, the material constituting the first transparent conductive layer 31A, the power of the laser, and the like. Further, the insulating section 21A may have a structure in which the first example and the second example are combined. For example, the first transparent electrode layer 12A may have a structure in which the element Pc migrates from the insulating section 21A into a layer underlying the first transparent electrode layer 12A while the conductive film is physically damaged. The element Pc is an element included in a plurality of elements constituting the electrode section 20A.

The insulating section 21B of the second transparent electrode layer 12B also has the same structure as the insulating section 21A, i.e., a structure in the first example, a structure in the second example, or a structure which is a combination of the first example and the second example.

In FIGS. 8 to 11, the cross-sectional shape of the insulating section 21A is shown such that a width of the insulating section 21A increases toward the first transparent support layer 13A, and the outer edge of the insulating section 21A has a curve bulging outward. This shape is on the assumption that the insulating section 21A is formed if the laser is focused on a central portion of the first transparent conductive layer 31A in the thickness direction to the surface in contact with the first transparent support layer 13A and the laser is irradiated from a position facing the first transparent support layer 13A. The cross-sectional shape of the insulating section 21A may be different from the shapes shown in FIGS. 8 to 11 depending on the laser irradiation direction, the focusing position, power, or the like.

Figure 12:
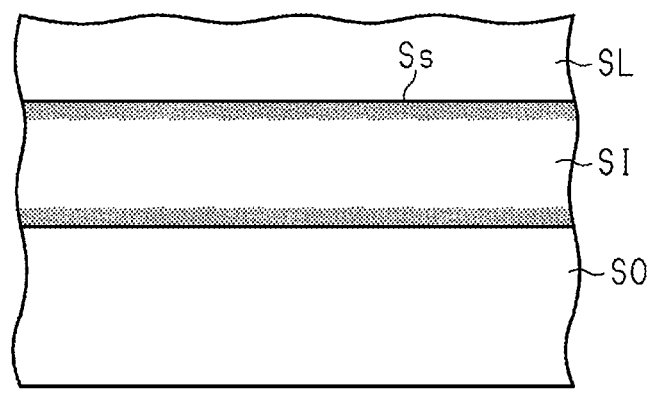
FIG. 12 shows an example of an appearance of an insulating region in the light control sheet according to the first embodiment.

Next, an appearance of the insulating sections 21A and 21B will be described. FIG. 12 is an enlarged view of an example of a planar structure in the vicinity of the insulating region SI of the light control sheet 10. When viewed in a direction perpendicular to a surface of the light control sheet 10, that is, in a direction perpendicular to the first transparent support layer 13A, the insulating region SI has a straight strip-shaped region Ss, which is a strip-shaped region having a constant width. The insulating sections 21A and 21B are formed by a continuous-wave laser.

At least part of the straight strip-shaped region Ss is discolored and appears dark. Accordingly, the visible light transmittance of the insulating region SI is lower than that of the light control region SL in a transparent state. FIG. 12 shows an example in which edge sections of the straight strip-shaped region Ss in the width direction are discolored.

The degree of discoloration varies in the straight strip-shaped region Ss, since the farther from the center at which the laser is focused, the lower the energy of the laser received by the multilayer laminate 30. According to the power of the laser, a portion where discoloration occurs in the straight strip-shaped region Ss can vary. For example, a central portion of the straight strip-shaped region Ss in the width direction may be discolored, or edge sections in the width direction and a central portion may be discolored.

One of the factors of discoloration is, for example, when the transparent support layers 13A and 13B are polyethylene terephthalate films, a portion of the transparent support layer 13A in contact with the insulating section 21A and a portion of the transparent support layer 13B in contact with the insulating section 21B become amorphous due to laser irradiation. Such a change into an amorphous state in the transparent support layer 13A and 13B is particularly likely to occur in a central portion of the straight strip-shaped region Ss in the width direction. Whether a change into an amorphous state occurs or not in the transparent support layer 13A and 13B can be controlled by the power of laser, focus position, and the like. Depending on whether it is desired to achieve high visibility of the straight strip-shaped region Ss, the laser irradiation conditions may be adjusted so that a change to the amorphous state occurs in at least one of the first transparent support layer 13A and the second transparent support layer 13B or that no change to the amorphous state occurs in either of the first transparent support layer 13A or the second transparent support layer 13B.

As viewed from a position facing the surface of the light control sheet 10, the insulating region SI may be configured such that a plurality of straight strip-shaped regions Ss are arranged in the width direction of the straight strip-shaped regions Ss. The insulating region SI composed of the plurality of straight strip-shaped regions Ss is formed by scanning a laser a plurality of times to a region that is to be the insulating region SI while gradually offsetting the laser irradiation position in the width direction of the region. The configuration in which the insulating region SI is composed of the plurality of straight strip-shaped regions Ss improves the reliability of insulation of the insulating section 21A between the electrode section 20A and the outer-peripheral conductive section 22A and insulation of the insulating section 21B between the electrode section 20B and the outer-peripheral conductive section 22B.

Figure 13:
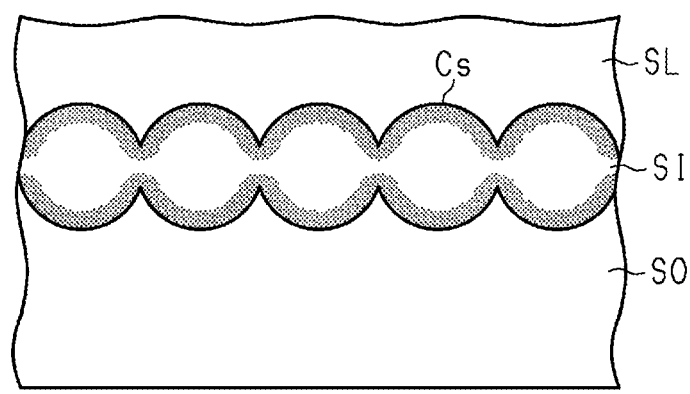
FIG. 13 shows an example of the appearance of the insulating region in the light control sheet according to the first embodiment.
Figure 14A:
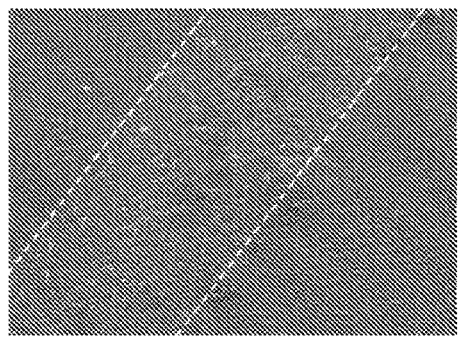
FIG. 14 (a) shows an SEM image of a surface of a light control layer of a multilayer laminate obtained by dividing a light control sheet of an example, and FIG. 14 (b), (c), and (d) show EDX mapping results of a region included in FIG. 14 (a).
Figure 14B:
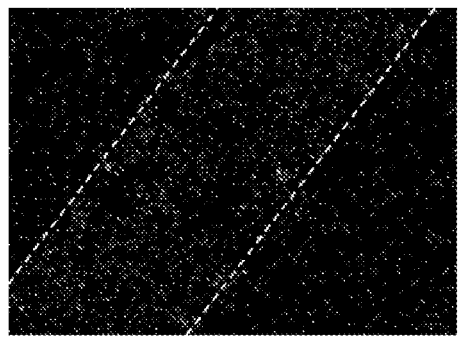
Figure 14C:
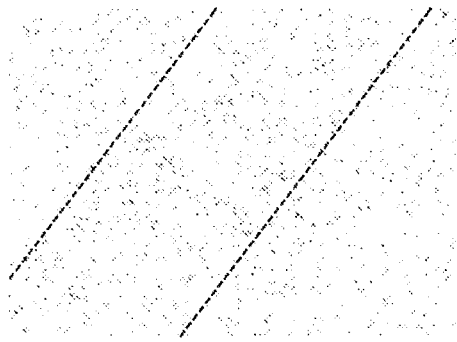
Figure 14D:
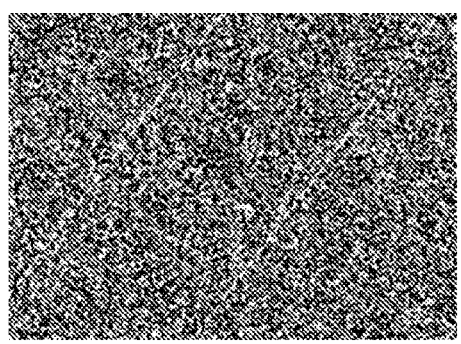

FIG. 13 is an enlarged view of another example of the planar structure in the vicinity of the insulating region SI of the light control sheet 10. When viewed in a direction perpendicular to a surface of the light control sheet 10, the insulating section SI is formed as a rounded strip-shaped region Cs having an outer shape formed of a sequence of rounded regions arranged in one direction. Specifically, the circular strip-shaped region Cs has an outer shape in which a plurality of circles are sequentially connected so that regions in the circles communicate with each other. The insulating sections 21A and 21B are formed by a pulsed laser.

At least part of the rounded strip-shaped region Cs is discolored and appears dull. Accordingly, the visible light transmittance of the insulating region SI is lower than that of the light control region SL in a transparent state. FIG. 13 shows an example in which edge sections of the rounded strip-shaped region Cs in the width direction, that is, a circumferential portion of the rounded regions connected to each other is discolored.

The degree of discoloration varies in the rounded strip-shaped region Cs, since the farther from the center at which the laser is focused, the lower the laser energy received by the multilayer laminate 30. The discolored section of the circular strip-shaped region Cs may vary according to the power of the laser. For example, a central portion of the rounded regions of the rounded strip-shaped region Cs may be discolored, or a circumferential portion and a central portion of the rounded regions may be discolored.

One of the reasons of discoloration is, as in the case of the straight strip-shaped region Ss, a portion of the transparent support layers 13A and 13B in contact with the insulating sections 21A and 21B becomes amorphous due to laser irradiation. Such a change into an amorphous state in the transparent support layers 13A and 13B is particularly likely to occur in a central portion of the rounded regions of the rounded strip-shaped region Cs. As in the case of the straight strip-shaped region Ss, whether a change into an amorphous state occurs or not in the transparent support layers 13A and 13B can be controlled by the power of the laser, focus position, and the like.

When the insulating sections 21A and 21B are formed by using a continuous-wave laser, the multilayer laminate 30 is continuously irradiated with a laser beam, so the heat generated by laser irradiation is not likely to dissipate. As a result, liquid crystals contained in the light control layer 11 may change into gas, generating gas bubbles. On the other hand, when a pulsed laser is used, the multilayer laminate 30 is intermittently irradiated with a laser beam. Accordingly, the heat generated by laser irradiation is more likely to dissipate compared with a case using a continuous-wave laser. This prevents generation of air bubbles in the light control layer 11.

As viewed in a direction perpendicular to the surface of the light control sheet 10, the insulating region SI may be configured such that a plurality of rounded strip-shaped regions Cs are arranged in the width direction of the rounded strip-shaped regions Cs. The insulating region SI composed of the plurality of rounded strip-shaped regions Cs is formed by scanning a laser a plurality of times to a region where the insulating region SI is to be formed while gradually offsetting the laser irradiation position in the width direction of the region. The configuration in which the insulating region SI is composed of the plurality of rounded strip-shaped regions Cs improves the reliability of insulation of the insulating section 21A between the electrode section 20A and the outer-peripheral conductive section 22A and insulation of the insulating section 21B between the electrode section 20B and the outer-peripheral conductive section 22B. In particular, when a pulsed laser is used, the width of the strip-shaped region, that is, the width of the insulating portion tends to have an irregular shape compared with a case using a continuous-wave laser. Accordingly, arranging a plurality of rounded strip-shaped regions Cs side by side is advantageous for improved reliability of the insulating properties. When the insulating region SI is composed of a plurality of strip-shaped regions, the length of the insulating region SI in the width direction is a length between one side of the plurality of strip-shaped regions and the other side of the plurality of strip-shaped regions in the width direction.

<Analysis of Laser Irradiated Region of ITO Layer>

Analysis was performed for the insulating section 21A formed by laser irradiation to the reverse type multilayer laminate 30 having the transparent conductive layers 31A and 31B made of ITO. The transparent support layers 13A and 13B were made of a polyethylene terephthalate film, and the light control layer 11 was made of a polymer network liquid crystal. Polyimide was used as a material of the alignment layers 14A and 14B.

<Laser Irradiation Conditions>

Type: IR semiconductor laser

Spot diameter: 30 µm
Laser type: pulsed laser
Repetition frequency: 1.2 kHz
Pulse width: 417 µs
Output: 0.008 W
Movement speed of table on which the multilayer laminate 30 is placed: 30 mm/s <Analysis Procedure>

According to the above laser irradiation conditions, the multilayer laminate 30 was irradiated with a laser from a position facing the first transparent support layer 13A, in which the laser wavelength is set to be absorbed by the ITO. Thus, a reverse type light control sheet 10R was formed. The light control layer 11 was divided in the thickness direction so that the light control sheet 10R is separated into a first multilayer laminate having the first transparent support layer 13A, the first transparent electrode layer 12A, the first alignment layer 14A, and part of the light control layer 11, and a second multilayer laminate having the second transparent support layer 13B, the second transparent electrode layer 12B, the second alignment layer 14B, and part of the light control layer 11.

The first multilayer laminate was observed with a scanning electron microscope (SEM) and analyzed by energy dispersive X-ray spectrometry (EDX). As the scanning electron microscope, a JSM-7001F manufactured by JEOL Ltd. was used. In the EDX analysis, measurement was performed in a direction perpendicular to the horizontal plane while a surface of the multilayer laminate was inclined by 30° relative to the horizontal plane in order to ensure the layer thickness of the analysis target.

<Analysis Results>

The appearance and composition of the first multilayer laminate and the second multilayer laminate were analyzed according to the above procedure, and it was confirmed that the insulating section 21A formed according to the above laser irradiation conditions had a structure of the first example. The analysis results will be described in detail below.

FIG. 14 (a) shows an SEM image of a surface of the first multilayer laminate on a side on which the light control layer 11 is located. FIGS. 14 (b) to (d) show the EDX mapping results of a region included in the image in FIG. 14 (a). FIG. 14 (b) shows distribution of indium (In), FIG. 14 (c) shows distribution of carbon (C), and FIG. 4 (d) shows distribution of oxygen (O). In the figures, a region sandwiched by two dotted lines is a region which has been irradiated with the laser, and a region outside the two dotted lines is a region which has not been irradiated with the laser.

As shown in FIG. 14 (a), the surface of the first multilayer laminate was rougher in the laser irradiated region than in the laser non-irradiated region.

As shown in FIG. 14 (b), In concentration in the light control layer 11 and the first alignment layer 14A is higher in the laser irradiated region than in the non-laser irradiated region. It seems that the reason why In is detected in the non-laser irradiated region is because the In included in the first transparent electrode layer 12A underlying the light control layer 11 is detected.

As shown in FIGS. 14 (c) and (d), distributions of C and O are not significantly different between the laser irradiated region and the non-laser irradiated region.

Accordingly, it is suggested that In, which is an element included in the first transparent electrode layer 12A, has migrated into the light control layer 11 in the laser irradiated region. From the observation result of the appearance of the first transparent electrode layer 12A described later, it seems that an increase of In in the laser irradiated region has occurred since the ITO film constituting the first transparent conductive layer 31A was removed from the first transparent support layer 13A when irradiated with the laser, and the fragments were dispersed into the light control layer 11.

Figure 15A:
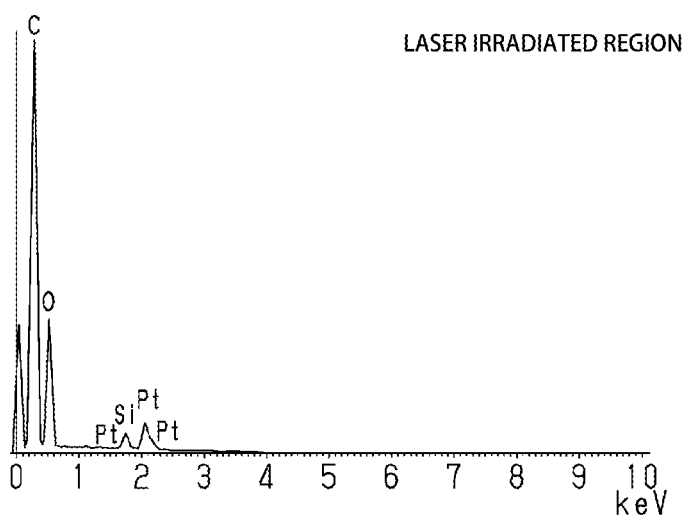
FIGS. 15 (a), (b), and (c) show EDX spectra of the multilayer laminate obtained by dividing the light control sheet in the example.
Figure 15B:
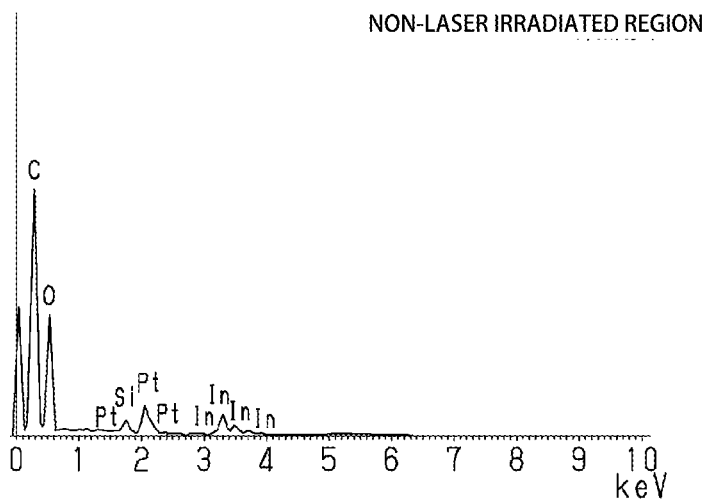
Figure 15C:
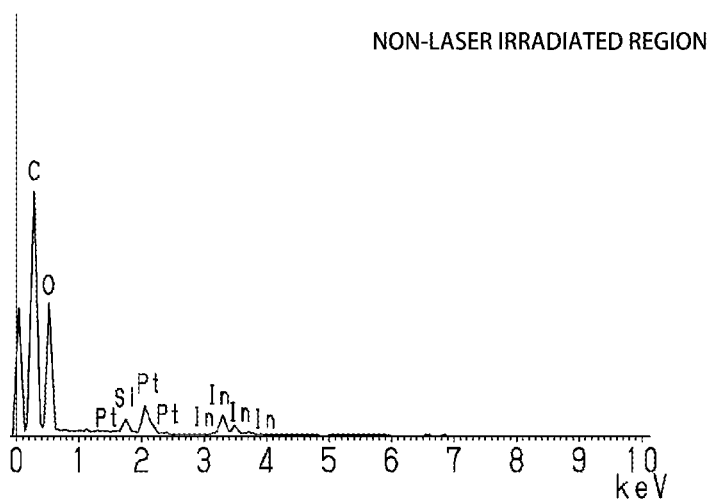

FIGS. 15 (a) to (c) show the EDX spectra measured for the points included in the laser irradiated region and the points included in two non-laser irradiated regions located on both sides of the laser irradiated region in the first multilayer laminate after the light control layer 11 and the first alignment layer 14A are wiped off by using methyl ethyl ketone. FIG. 15 (a) shows an EDX spectrum in the laser irradiated region, and FIGS. 15 (b) and (c) show EDX spectra in the non-laser irradiated region.

As shown in FIG. 15 (a), no in was detected in the laser irradiated region. On the other hand, as shown in FIGS. 15 (b) and (c), In is detected in the non-laser irradiated region. This suggests that in the first transparent electrode layer 12A, the ITO film is present in the laser non-irradiated regions, and the ITO film is damaged in the laser irradiated region. Thus, it is suggested that in the laser irradiated region, the ITO film was fragmented by laser irradiation and the fragments were scattered outside the first transparent electrode layer 12A. The detected Pt is derived from the coating applied to the sample as pretreatment.

Figure 16:
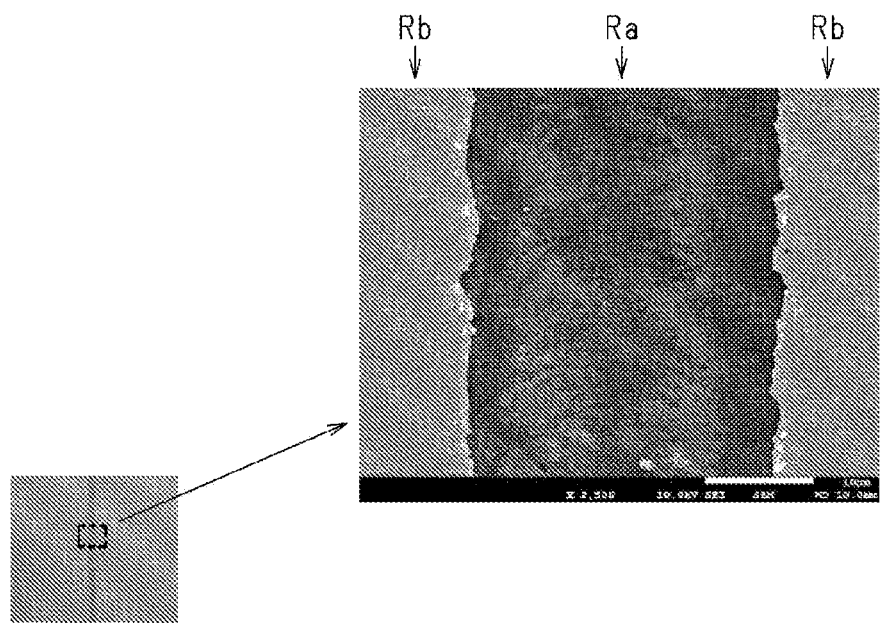
FIG. 16 shows an SEM image of a section in the vicinity of an insulating section of the multilayer laminate obtained by dividing the light control sheet in the example.

FIG. 16 is an SEM image of a surface of the first multilayer laminate after the light control layer 11 and the first alignment layer 14A are removed by wiping with methyl ethyl ketone. In FIG. 16, a region Ra is a region which has been irradiated with a laser, and a region Rb is a region which has not been irradiated with a laser.

FIG. 16 shows that the ITO film is damaged in the laser irradiated region. In FIG. 16, a region having the damaged ITO film in the first transparent electrode layer 12A has a width of approximately 30 µm.

The analysis suggests that when the first transparent conductive layer 31A is composed of ITO, in other words, when the electrode section 20A and the outer-peripheral conductive section 22A of the first transparent electrode layer 12A are composed of ITO, the insulating section 21A formed under the above laser irradiation conditions has a structure of the first example described above. That is, in the insulating section 21A, a physical structure of the first transparent conductive layer 31A is damaged, the conductive film is removed from the first transparent support layer 13A, and the fragments of the conductive film are dispersed into the light control layer 11.

Figure 17:
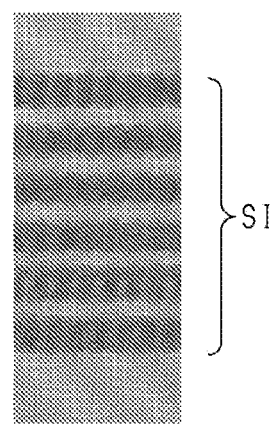
FIG. 17 shows a stereoscopic microscope image of an insulating region of the light control sheet in the example.

FIG. 17 is a stereoscopic microscope image of the reverse type light control sheet 10R formed by laser irradiation in a direction perpendicular to the first transparent support layer 13A based on the above laser irradiation conditions. The image was captured as viewed in a direction perpendicular to the first transparent support layer 13A.

As seen from FIG. 17, the insulating region SI is formed as a rounded strip-shaped region Cs having an outer shape formed of a sequence of rounded regions. Further, the insulating region SI appears dull compared with the light control region SL, suggesting that the visible light transmittance of the insulating region SI is lower than that of the light control region SL. When only the first transparent support layer 13A is observed, cloudiness due to a change into an amorphous state was observed on a surface in contact with the first transparent electrode layer 12A in the laser irradiated region.

<Effects>

Effects of the first embodiment will be described. In the light control sheet 10, the electrode section 20A and each of the outer-peripheral conductive sections 22A are insulated by each of the insulating sections 21A, and the electrode section 20B and each of the outer-peripheral conductive sections 22B are insulated by each of the insulating sections 21B. Furthermore, the sections of the transparent electrode layers 12A and 12B exposed on the edge surface 10E of the light control sheet 10 are the outer-peripheral conductive sections 22A and 22B, respectively. Thus, even when a conductive material such as water or conductive dust is attached to the edge surface 10E, and the outer-peripheral conductive section 22A and the outer-peripheral conductive section 22B are electrically connected to each other, no electrical conduction is established between the electrode section 20A and the electrode section 20B. This can prevent a short circuit due to attachment of conductive material to the edge surface 10E. Even when an edge section of the light control sheet 10 is compressed by external force and the outer-peripheral conductive section 22A and the outer-peripheral conductive section 22B are brought into contact with each other, no electrical conduction is established between the electrode section 20A and the electrode section 20B. Thus, a short circuit due to compression of the edge section can also be prevented.

In particular, to a light control sheet having a large area such as a light control sheet used for a construction material, a high driving voltage is applied, considering the influence of voltage gradient in the light control sheet. Accordingly, the prevention of a short circuit is highly important. Thus, it is highly beneficial to apply the configuration in the first embodiment to a light control sheet having a large area.

When an electrolytic solution contacts an oxide semiconductor such as ITO while a voltage is applied to the oxide semiconductor, the oxide semiconductor is reduced by an electrochemical reaction, resulting in corrosion. Water that can adhere to the light control sheet 10 may be caused by condensation or rain and often contains salt. Accordingly, the water can function as an electrolytic solution. Thus, assuming that the transparent electrode layers 12A and 12B are formed of an oxide semiconductor, if the electrode sections 20A and 20B are exposed on the edge surface 10E of the light control sheet 10, water may adhere to the edge surface 10E and cause corrosion of the electrode sections 20A and 20B, resulting in an increase in resistance or disconnection. On the other hand, in the light control sheet 10 of the first embodiment, the sections exposed on the edge surface 10E are the outer-peripheral conductive sections 22A and 22B that are insulated from the electrode sections 20A and 20B, respectively. This prevents corrosion of the electrode sections 20A and 20B. Furthermore, no voltage is applied to the outer-peripheral conductive sections 22A and 22B, and this also prevents corrosion of the outer-peripheral conductive sections 22A and 22B. That is, corrosion of the entire transparent electrode layers 12A and 12B is prevented.

As described above, the insulating sections 21A and 21B formed by laser irradiation are often more fragile than the electrode sections 20A and 20B and the outer-peripheral conductive sections 22A and 22B. Thus, as compared with a configuration in which the insulating sections 21A and 21B are arranged at the edge section of the light control sheet 10, in the configuration in which the outer-peripheral conductive sections 22A and 22B, which are conductive films that are not broken or modified by laser irradiation, are arranged at the edge section of the light control sheet 10, the layers constituting the light control sheet 10 are prevented from being removed at the edge section of the light control sheet 10.

The attachment of conductive dust to the edge surface 10E of the light control sheet 10 may also be prevented by sealing the edge surface 10E with resin to cover the edge surface 10E. However, the resin sealing structure does not necessarily have sufficient waterproof properties; thus, water may permeate the resin sealing structure and adhere to the edge surface 10E. Furthermore, when cracks or peeling occurs in the resin sealing structure, a conductive material may enter from a gap due to the cracks or peeling and adhere to the edge surface 10E. In the light control sheet 10 of the first embodiment, even when a conductive material is attached to the edge surface 10E, a short circuit and corrosion of the electrode sections 20A and 20B are prevented; thus, the short circuit and corrosion are suitably prevented compared with the resin sealing structure. The edge surface 10E of the light control sheet 10 in the first embodiment may or may not be sealed with resin. The configuration in which the end surface 10E of the light control sheet 10 is not sealed with resin can reduce the work required to attach the light control sheet 10 to the transparent plate 50.

As described for the above production method, when the light control sheet 10 is formed from the multilayer laminate 30 cut out from a large sheet, the transparent electrode layers 12A and 12B are exposed on the edge surface 10E of the light control sheet 10. In such a light control sheet, it is important to prevent a short circuit and corrosion of the electrode layer on the edge surface. Thus, it is highly beneficial to apply the configuration in the first embodiment to a light control sheet formed by the above production method.

Since the insulating sections 21A and 21B are formed by irradiating the multilayer laminate 30 with a laser, compared with the case where the insulating sections 21A and 21B are formed by photolithography and etching, it is possible to reduce the number of steps required to produce the light control sheet 10 and also reduce the production time. The production cost can also be reduced. Since the insulating section 21A of the first transparent electrode layer 12A and the insulating section 21B of the second transparent electrode layer 12B are collectively formed, as compared with the case where the insulating section 21A of the first transparent electrode layer 12A and the insulating section 21B of the second transparent electrode layer 12B are separately formed, the insulating sections 21A and 21B can be efficiently produced.

In addition, compared with the insulating section formed by photolithography and etching, the insulating sections 21A and 21B formed by laser irradiation can be less conspicuous.

As described above, the first embodiment achieves the following effects.

(1) In the surface direction, the electrode sections 20A and 20B are adjacent to the insulating sections 21A and 21B, respectively, and in plan view of the surface of the light control sheet 10, the insulating sections 21A and 21B extend along the outer edges of the electrode sections 20A and 20B, respectively. Thus, at the sections at which the insulating sections 21A and 21B are arranged, the electrode sections 20A and 20B are not exposed on the edge surface 10E of the light control sheet 10. This can prevent a short circuit due to adhesion of a conductive material to the edge surface 10E. When the electrode sections 20A and 20B are composed of an oxide semiconductor, corrosion of the electrode sections 20A and 20B due to adhesion of water to the edge surface 10E can be prevented.

(2) In plan view, the insulating section 21A is sandwiched between the electrode section 20A and the outer-peripheral conductive section 22A and the insulating section 21B is sandwiched between the electrode section 20B and the outer-peripheral conductive section 22B, and the outer-peripheral conductive sections 22A and 22B are exposed on the edge surface 10E of the light control sheet 10. The insulating sections 21A and 21B formed by laser irradiation are more brittle than the outer-peripheral conductive sections 22A and 22B. Thus, according to the above configuration, compared with the configuration in which the insulating sections 21A and 21B are arranged at the edge section of the light control sheet 10, the layers constituting the light control sheet 10 are prevented from being removed from each other at the edge section of the light control sheet 10.

(3) In plan view, the insulating sections 21A and 21B have annular shapes surrounding the entire electrode sections 20A and 20B, and the light control region SL and the connection region SA are located in the region completely surrounded by the insulating section 21A, and the light control region SL and the connection region SB are located in the range completely surrounded by the insulating section 21B. According to such a configuration, the electrode sections 20A and 20B are not exposed at all on the edge surface 10E of the light control sheet 10; thus, a short circuit and corrosion of the electrode sections 20A and 20B are accurately prevented. Furthermore, compared with a configuration in which the connection regions SA and SB are located at the edge section of the light control sheet 10, it is possible to prevent peeling of the layers constituting the light control sheet 10 from proceeding from sections in the vicinity of the connection regions SA and SB from which some of the layers of the light control sheet 10 have been removed.

(4) Since the insulating sections 21A and 21B are formed by laser irradiation, compared with the production method in which the insulating sections 21A and 21B are formed by photolithography and etching, it is possible to reduce the number of steps required to produce the light control sheet 10. Furthermore, since the insulating sections 21A and 21B are formed after formation of the multilayer laminate 30, it is easy to perform design changes in the shape of the light control sheet 10, the shape of the light control region SL, and the like. Furthermore, since the insulating section 21A of the first transparent electrode layer 12A overlaps the insulating section 21B of the second transparent electrode layer 12B in plan view, the insulating sections 21A and 21B can be collectively formed by laser irradiation. Thus, the insulating sections 21A and 21B can be formed with high efficiency.

(5) The configuration in which the insulating sections 21A and 21B are sections at which the conductive film is dagaged can be suitably formed by laser irradiation. The insulating section 21A may be a section at which the conductive film is removed from the transparent support layer 13A, and fragments of the conductive film removed from the transparent support layer 13A may be located at a section in the vicinity of the insulating section 21A in the functional layer in contact with the transparent electrode layer 12A. The insulating section 21B may be a section at which the conductive film is removed from the transparent support layer 13B, and fragments of the conductive film removed from the transparent support layer 13B may be located at a section in the vicinity of the insulating section 21B in the functional layer in contact with the transparent electrode layer 12B. In this case, the insulating sections 21A and 21B can be suitably formed by laser irradiation to the transparent conductive layers 31A and 31B, while the light control layer 11 is sandwiched between a first sheet composed of the first transparent support layer 13A and the first transparent conductive layer 31A and a second sheet composed of the second transparent support layer 13B and the second transparent conductive layer 31B.

In the functional layer in contact with the transparent electrode layer 12A, the section in contact with the insulating section 21A may have a higher content of at least one or more of the plurality of elements constituting the electrode section 20A and the outer-peripheral conductive section 22A than the sections of the functional layer in contact with the electrode section 20A and the outer-peripheral conductive section 22A. In the functional layer in contact with the transparent electrode layer 12B, the section in contact with the insulating section 21B may have a higher content of at least one or more of the plurality of elements constituting the electrode section 20B and the outer-peripheral conductive section 22B than the sections of the functional layer in contact with the electrode section 20B and the outer-peripheral conductive section 22B. Such a configuration can be suitably formed by forming the insulating sections 21A and 21B by laser irradiation to the transparent conductive layers 31A and 31B, respectively, while the light control layer 11 is sandwiched between the first sheet and the second sheet.

The surfaces of the insulating sections 21A and 21B may be rougher than the surfaces of the electrode sections 20A and 20B and the outer-peripheral conductive sections 22A and 22B. In this case, the insulating sections 21A and 21B can be suitably formed by laser irradiation to the transparent conductive layers 31A and 31B, each of which is a single conductive film.

(6) In plan view, the visible light transmittance of the insulating region SI is lower than that of the light control region SL. The insulating sections 21A and 21B constituting the insulating region SI can be suitably formed by laser irradiation.

(7) In plan view, the insulating region SI is composed of the rounded strip-shaped region Cs having an outer shape formed of a sequence of a plurality of rounded regions arranged in one direction. The insulating sections 21A and 21B constituting the insulating region SI can be suitably formed by a pulsed laser. Use of the pulsed laser enables formation of the insulating sections 21A and 21B while dissipating heat generated by laser irradiation. This prevents generation of air bubbles in the light control layer 11.

Second Embodiment

A second embodiment of the light control sheet and the method of producing the light control sheet will be described with reference to FIGS. 18 and 19. The second embodiment differs from the first embodiment in the arrangement of the connection regions SA and SB and the insulating sections 21A and 21B. In the following, differences between the second embodiment and the first embodiment will mainly be described, and the same components as in the first embodiment are given the same reference numerals and are not described. Either the normal-type structure or the reverse-type structure can be applied to the light control sheet in the second embodiment.

<Configuration of Light Control Sheet>

Figure 18:
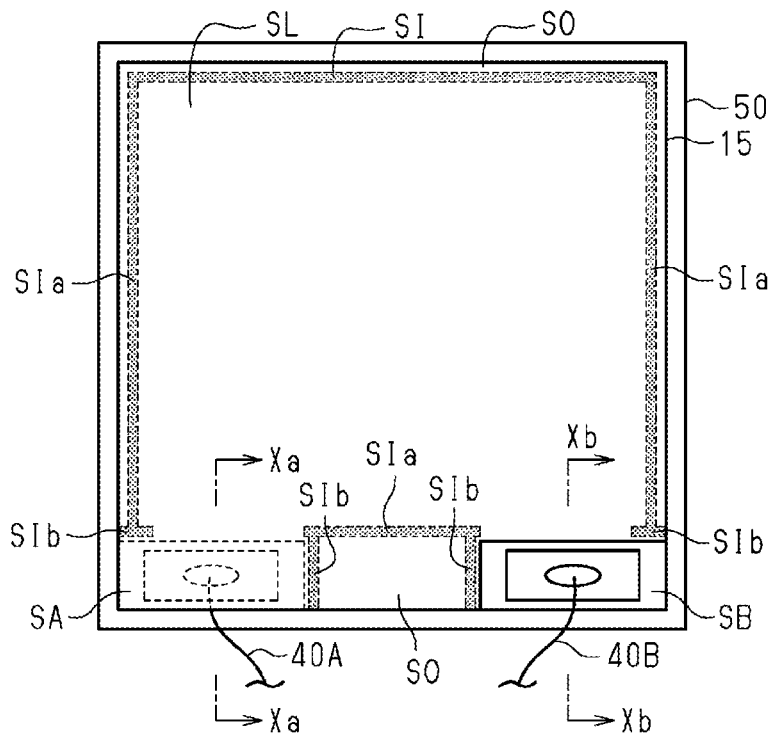
FIG. 18 shows a planar structure of a light control sheet according to a second embodiment of the light control sheet.

As shown in FIG. 18, a light control sheet 15 in the second embodiment has a rectangular shape in plan view as viewed in a direction perpendicular to a surface of the light control sheet 15, and has the connection regions SA and SB at corner sections of the light control sheet 15. Specifically, the first connection region SA and the second connection region SB are arranged along one side of the light control sheet 15. The first connection region SA is located at one edge section of the light control sheet 15 in a direction in which the side of the light control sheet 15 extends, and the second connection region SB is located at another edge section of the light control sheet 15 in the direction in which the side of the light control sheet 15 extends.

At the corner sections of the light control sheet 15, outer edges of the connection regions SA and SB constitute an outer edge of the light control sheet 15. Thus, in plan view, the connection region SA is not surrounded by the insulating section 21A, the outer-peripheral conductive section 22A and the light control region SL. Also, the connection region SB is not surrounded by the insulating section 21B, the outer-peripheral conductive section 22B and the light control region SL.

In plan view, the insulating region SI is located outside the light control region SL. However, the insulating region SI does not surround the entire light control region SL. In at least a part in the vicinity of the first connection region SA and at least a part in the vicinity of the second connection region SB, the insulating region SI is not provided.

The insulating region SI includes a main insulating region SIa and a sub insulating region SIb. The main insulating region SIa is located outside the light control region SL and extends along an outer edge of the light control region SL, and the sub insulating region SIb extends from an edge section of the main insulating region SIa to the outer edge of the light control sheet 15. The main insulating region SIa is interrupted in the vicinity of the first connection region SA, and at the section at which the main insulating region SIa is interrupted, the light control region SL and the first connection region SA are adjacent to each other. Furthermore, the main insulating region SIa is interrupted in the vicinity of the second connection region SB, and at the section at which the main insulating region SIa is interrupted, the light control region SL and the second connection region SB are adjacent to each other. The sub insulating region SIb extends from the edge section at which the main insulating region SIa is interrupted to the outer edge of the light control sheet 15. Thus, the conductive region SO surrounded by the insulating region SI and the outer edge of the light control sheet 15 is formed. The conductive region SO is separated from the light control region SL. The conductive region SO is located outside the light control region SL, but does not surround the entire light control region SL.

In the configuration shown in FIG. 18 as an example, the light control region SL has a substantially rectangular shape. The light control region SL and the first connection region SA are adjacent to each other at a section along a side of the light control region SL, and the main insulating region SIa is interrupted at this section. From each of the edge sections of the interrupted main insulating region Sia, the sub insulating region SIb extends along the first connection region SA to the outer edge of the light control sheet 15. Furthermore, the light control region SL and the second connection region SB are adjacent to each other at a section along the side of the light control region SL. The main insulating region SIa is also interrupted at this section. From each of the edge sections of the interrupted main insulating region Sia, the sub insulating region SIb extends along the second connection region SB to the outer edge of the light control sheet 15.

The shape of the light control region SL and the arrangement of the insulating region SI are not limited to the example shown in FIG. 18. The light control sheet 15 only needs to be configured such that the insulating region SI is located along the outer edge of the light control region SL, a section is provided at which the insulating region SI is not provided and the light control region SL is adjacent to the connection region SA and a section is provided at which the insulating region SI is not provided and the light control region SL is adjacent to the connection region SB, and the light control region SL and the conductive region SO are separated from each other by the insulating region SI.

Structures in the vicinity of the connection regions SA and SB will be described with reference to FIG. 19. FIG. 19 shows examples of the normal-type structures.

Figure 19A:
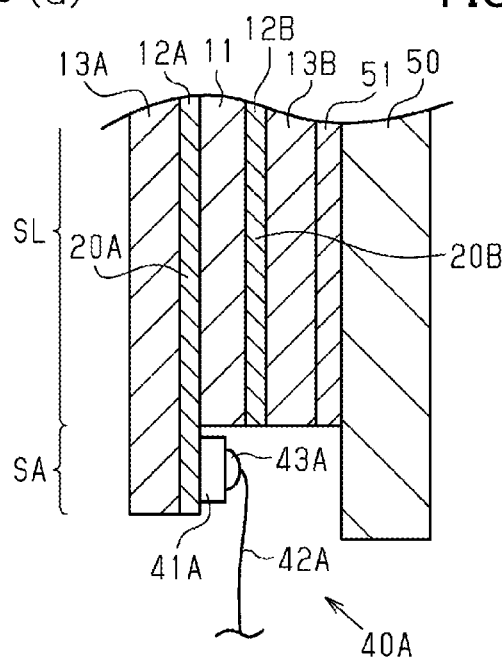
FIG. 19 (a) shows a cross-sectional structure taken along line Xa-Xa in FIG. 18, and FIG. 19 (b) shows a cross-sectional structure taken along line Xb-Xb in FIG. 18.
Figure 19B:
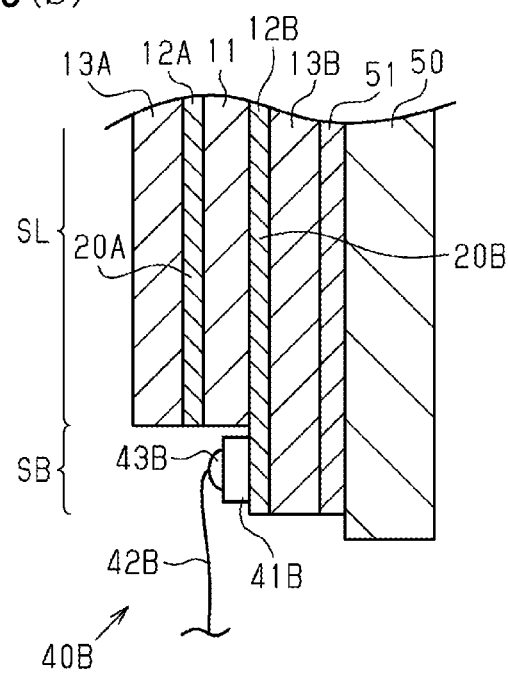

As shown in FIG. 19 (*a*), as in the first embodiment, in the first connection region SA, a surface of the first transparent electrode layer 12A facing away from the first transparent support layer 13A is exposed from other layers of the light control sheet 15, and is facing to the transparent plate 50. At the section at which the insulating region SI is interrupted, the electrode section 20A is continuous between the light control region SL and the first connection region SA. The first wiring section 40A is connected to the electrode section 20A in the first connection region SA, and thus a driving voltage is applied to the electrode section 20A in the light control region SL through the first wiring section 40A.

As shown in FIG. 19 (*b*), as in the first embodiment, in the second connection region SB, a surface of the second transparent electrode layer 12B facing away from the second transparent support layer 13B is exposed from other layers of the light control sheet 15, and constitutes the outermost surface of the light control sheet 15. At the section at which the insulating region SI is interrupted, the electrode section 20B is continuous between the light control region SL and the second connection region SB. The second wiring section 40B is connected to the electrode section 20B in the second connection region SB. Thus, a driving voltage is applied to the electrode section 20B in the light control region SL through the second wiring section 40B.

As in the first embodiment, the light control sheet 15 of the second embodiment is produced by laser irradiation to the multilayer laminate 30 to form the insulating sections 21A and 21B, and the connection regions SA and SB.

<Effects>

Effects of the second embodiment will be described. In the light control sheet 15, the connection regions SA and SB are arranged at the corner sections of the light control sheet 15. Thus, compared with the first embodiment in which the connection regions SA and SB are surrounded by other regions, it is easy to form the connection regions SA and SB, and it is easy to connect the wiring sections 40A and 40B to the connection regions SA and SB. In the first embodiment, in order to lead the wiring sections 40A and 40B to an outer peripheral region of the light control sheet 10, the wiring section 40A is required to be extended over the insulating region SI and the conductive region SO that surround the connection region SA, and the wiring section 40B is required to be extended over the insulating region SI and the conductive region SO that surround the connection region SB. On the other hand, in the second embodiment, the wiring sections 40A and 40B can be directly led to the outer peripheral region from the connection regions SA and SB. Thus, a bending force or the like is less likely to be applied to the wiring sections 40A and 40B. This improves the reliability of the electrical conduction between the electrode section 20A and the drive circuit due to the wiring section 40A, and the electrical conduction between the electrode section 20B and the drive circuit due to the wiring section 40B. Furthermore, since the wiring sections 40A and 40B are located at the edge sections of the light control sheet 15, it is easy to secure, in the light control region SL, a large region that has, for example, a rectangular shape and allows a user of the light control sheet 15 to visually recognize a situation behind the light control sheet 15 without being blocked by the wiring sections 40A and 40B.

Also in the second embodiment, at the sections at which the outer-peripheral conductive sections 22A and 22B are located, the outer-peripheral conductive section 22A insulated from the electrode section 20A and the outer-peripheral conductive section 22B insulated from the electrode section 20B are exposed on the edge surface 10E of the light control sheet 15. On the other hand, in the connection regions SA and SB, the electrode sections 20A and 20B are exposed on the edge surface 10E of the light control sheet 15. According to such a configuration, in at least the sections at which the outer-peripheral conductive sections 22A and 22B are located, a short circuit and corrosion of the electrode sections 20A and 20B, due to adhesion of conductive material to the edge surface 10E, are prevented, compared with a configuration in which the insulating sections 21A and 21B and the outer-peripheral conductive sections 22A and 22B are not provided at all and the electrode sections 20A and 20B are exposed on the edge surface 10E over the entire perimeter of the light control sheet. Since the electrode section exposed on the edge surface 10E in each of the connection regions is one of the electrode section 20A in the connection region SA and the electrode section 20B in the connection region SB, even when a conductive material is attached to the edge surface 10E, a short circuit is less likely to occur.

In the first embodiment, the entire light control region SL is surrounded by the insulating sections 21A and 21B and the outer-peripheral conductive sections 22A and 22B, and the electrode sections 20A and 20B are not exposed over the entire periphery on the edge surface 10E of the light control sheet 10. Accordingly, the first embodiment is more effective in preventing a short circuit and corrosion of the electrode sections 20A and 20B than the second embodiment. Thus, if the prevention of a short circuit and corrosion is prioritized, it is preferable to employ the structure in the first embodiment.

On the other hand, although the second embodiment is less effective in preventing a short circuit and corrosion of the electrode sections 20A and 20B than the first embodiment, as described above, the location of the connection regions SA and SB at the edge sections of the light control sheet 15 achieves various effects these effects are prioritized, it is preferable to employ the structure in the second embodiment.

As described above, in addition to the effects (1), (2), and (4) to (7) of the first embodiment, the second embodiment achieves the following effects.

(8) The connection regions SA and SB are located at the edge sections of the light control sheet 15 in plan view, and the insulating sections 21A and 21B are interrupted in the vicinity of the connection regions SA and SB. Such a configuration can improve the ease of forming the connection regions SA and SB and connecting the wiring section 40A to the connection region SA and the wiring section 40B to the connection region SB while preventing a short circuit and corrosion of the electrode sections 20A and 20B.

<Modifications of First Embodiment and Second Embodiment>

The above-described first embodiment and second embodiment can be carried out with the following modifications. The following modifications may be implemented in combination.

The surface of the first transparent support layer 13A facing away from the first transparent electrode layer 12A may be bonded to the transparent plate 50, and the surface of the second transparent support layer 13B facing away from the second transparent electrode layer 12B may constitute the surface of the light control sheet.

The second transparent electrode layer 12B may not necessarily have the insulating section 21B and the outer-peripheral conductive section 22B, and the electrode section 20B may extend to the edge surface 10E of the light control sheet. Such a configuration also prevents short circuits due to attachment of a conductive material to the edge surface 10E. Furthermore, in the first transparent electrode layer 12A having the insulating section 21A and the outer-peripheral conductive section 22A, corrosion of the electrode section 20A is also prevented.

When the insulating section 21A is formed only in the first transparent electrode layer 12A, the multilayer laminate 30 may be irradiated with a laser from a position facing the first transparent support layer 13A or may be irradiated with a laser from a position facing the second transparent support layer 13B. According to the production method in which laser is irradiated in a direction perpendicular to the first transparent support layer 13A, since the insulating section is formed in the transparent conductive layer, which is one of the two transparent conductive layers which is located closer to the laser light source, irradiation conditions of laser can be easily set. Adjustment of the power and the focus position of the laser makes it possible to control whether to process by laser irradiation only the first transparent conductive layer 31A or both the first transparent conductive layer 31A and the second transparent conductive layer 31B.

In the case where only the first transparent electrode layer 12A has the insulating section 21A, as viewed in a direction perpendicular to the surface of the light control sheet, the insulating region SI is composed of the straight strip-shaped region Ss or the rounded strip-shaped region Cs. Between the case where the second transparent electrode layer 12B has the insulating section 21B and the case where the second transparent electrode layer 12B does not have the insulating section 21B, the degree of discoloration in the strip-shaped regions Ss and Cs may vary, but the outer shape does not significantly vary.

Instead of the insulating section 21B, the second transparent electrode layer 12B may have a strip-shaped section in which sections having insulation properties are intermittently arranged. As viewed in a direction perpendicular to the surface of the light control sheet, the strip-shaped section overlaps the insulating section 21A of the first transparent electrode layer 12A. As in the method of producing the light control sheet 10 in the first embodiment, such a strip-shaped section is formed simultaneously with the insulating section 21A of the first transparent electrode layer 12A by collectively processing the first transparent conductive layer 31A and the second transparent conductive layer 31B by laser irradiation. A ratio of the sections having insulation properties in the strip-shaped section can be adjusted by adjusting the power and the focus position of the laser.

Figure 20:
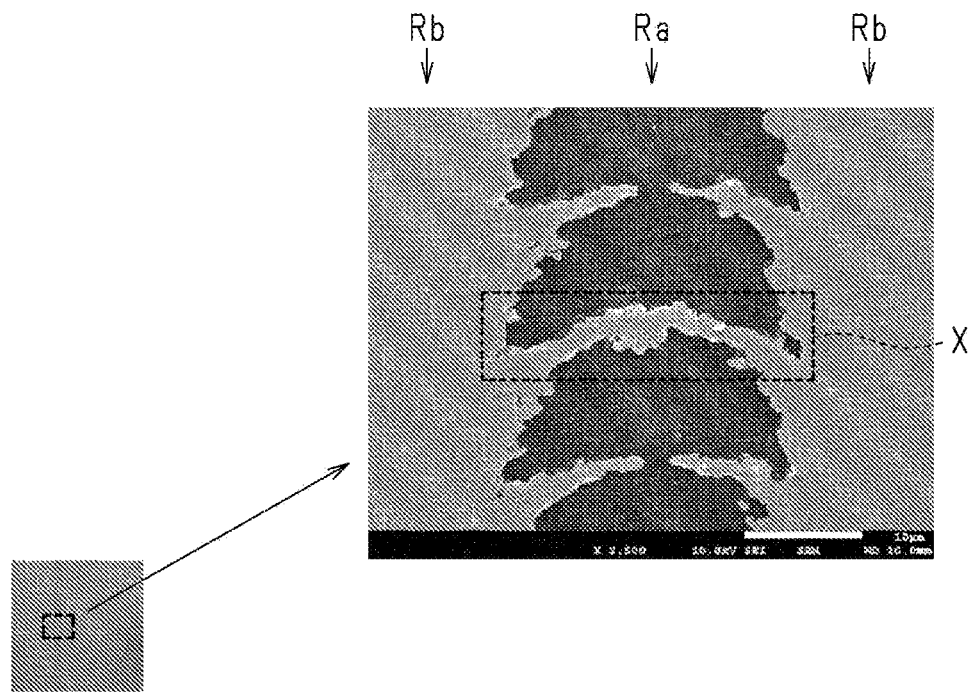
FIG. 20 shows an SEM image of a section in the vicinity of a strip-shaped section of a multilayer laminate obtained by dividing a light control sheet in an example.

Using the same procedure by which the results shown in FIG. 16 were obtained, a strip-shaped section formed in the second transparent electrode layer 12B of the second multilayer laminate was observed. FIG. 20 shows an SEM image of the surface of the second multilayer laminate after the light control layer 11 and the second alignment layer 14B are wiped off using methyl ethyl ketone. In FIG. 20, a region Ra indicates a region that has been irradiated with a laser, and a region Rb indicates a region that has not been irradiated with a laser.

As shown in FIG. 20, there is a region X, which is a portion of an ITO film extending from the non-laser irradiated region which remains connected in the laser irradiated region. That is, in the second transparent electrode layer 12B shown in FIG. 20, portions damaged by laser irradiation are intermittently arranged. In other words, in the second transparent electrode layer 12B shown in FIG. 20, a strip-shaped section was formed in which sections having insulation properties are intermittently arranged. In FIG. 20, a region having the damaged ITO film in the second transparent electrode layer 12B has a width of approximately 25 μm.

In the case where a strip-shaped section is formed in the second transparent conductive layer 31B, in formation of the insulating section 21A in the first transparent conductive layer 31A, loss of conductivity in part of the second transparent electrode layer 31B can be allowed. Accordingly, the first transparent conductive layer 31A is more likely to receive sufficient energy from the laser compared with the case where the insulating portion is formed only in the first transparent conductive layer 31A. Therefore, the insulating section 21A can be suitably formed.

The insulating section 21A of the first transparent electrode layer 12A and the insulating section 21B of the second transparent electrode layer 12B may be separately formed. For example, the insulating section 21A may be formed by laser irradiation from a direction perpendicular to the first transparent support layer 13A, and the insulating section 21B may be formed by laser irradiation from a direction perpendicular to the second transparent support layer 13B. Furthermore, before the multilayer laminate 30 is formed, the insulating section 21A may be formed by laser irradiation to the first transparent conductive layer 31A laminated on the first transparent support layer 13A, and the insulating section 21B may be formed by laser irradiation to the second transparent conductive layer 31B laminated on the second transparent support layer 13B. Then, after the insulating sections 21A and 21B are formed, a multilayer laminate may be formed so that the light control layer 11 is sandwiched between the first transparent electrode layer 12A and the second transparent electrode layer 12B.

At least one of the first transparent electrode layer 12A and the second transparent electrode layer 12B may be configured to have no outer-peripheral conductive section and have an insulating section extending to the edge surface 10E of the light control sheet.

In the second embodiment, the connection regions SA and SB only need to be arranged at the edge sections of the light control sheet 15 and constitute the outer edge of the light control sheet 15, and may not necessarily be arranged at the corner sections of the light control sheet 15. In the configuration in which the connection regions SA and SB are arranged at the corner sections of the light control sheet 15, the connection regions SA and SB are more easily formed, and when the insulating region SI is arranged to be interrupted in the vicinity of the connection regions SA and SB, a path in which the insulating region SI extends is prevented from having a complicated shape.

In the second embodiment, in the vicinity of the first connection region SA, at least the insulating section 21A of the first transparent electrode layer 12A is interrupted. The insulating section 21B of the second transparent electrode layer 12B may be extended without being interrupted. Furthermore, in the vicinity of the second connection region SB, at least the insulating section 21B of the second transparent electrode layer 12B is interrupted. The insulating section 21A of the first transparent electrode layer 12A may be extended without being interrupted.

Third Embodiment

A third embodiment of the light control sheet and the method of producing the light control sheet will be described with reference to FIGS. 21 to 24. The third embodiment differs from the first embodiment in the method of forming an insulating section. The following description will be described focusing on differences between the third embodiment and the first embodiment, and configuration that is the same as that of the first embodiment will be referred to by the same reference numbers and the description thereof will be omitted. Either the normal-type structure or the reverse-type structure can be applied to the light control sheet in the third embodiment.

<Configuration of Light Control Sheet>

Insulating sections 23A and 23B of a light control sheet 16 in the third embodiment are formed by etching the transparent conductive layers 31A and 31B, respectively. The insulating sections 23A and 23B formed by etching are easily formed to have a large width compared with an insulating section formed by laser irradiation.

Figure 21:
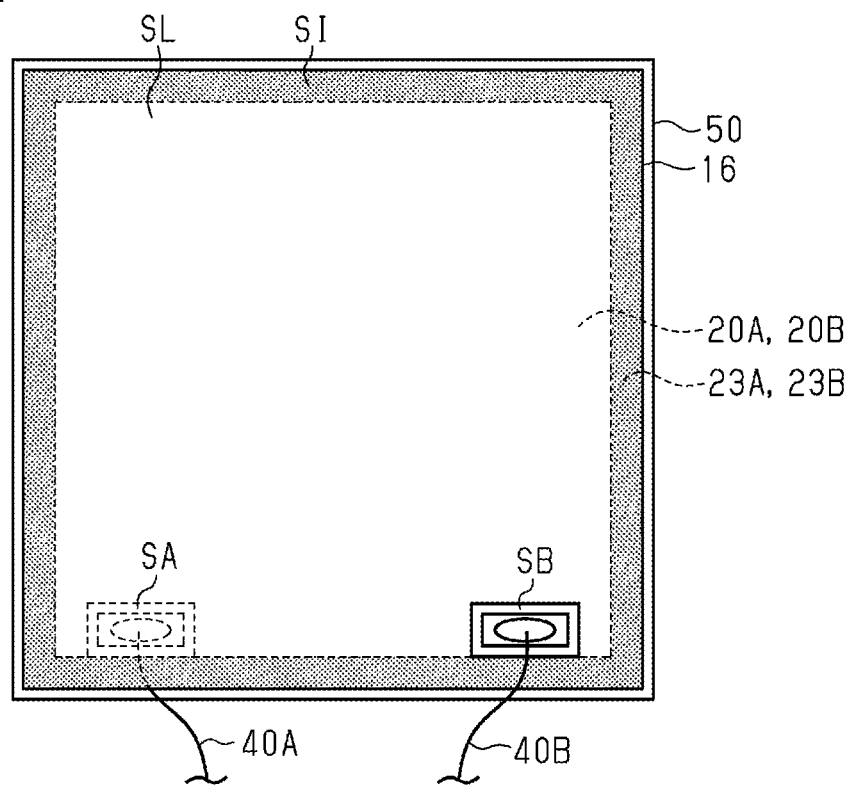
FIG. 21 shows a planar structure of a light control sheet according to a third embodiment of the light control sheet.

As shown in FIG. 21, the light control sheet 16 does not have the conductive region SO, and the insulating region SI extends to an outer edge of the light control sheet 16. In plan view of a surface of the light control sheet 16, the insulating region SI surrounds the entire light control region SL. The light control sheet 16 has the light control region SL, the first connection region SA, and the second connection region SB in a region surrounded by the insulating region SI. The connection regions SA and SB may be apart from the insulating region SI or may be in contact with the insulating region SI. FIG. 21 shows an example in which the connection regions SA and SB are in contact with the insulating region SI.

Figure 22:
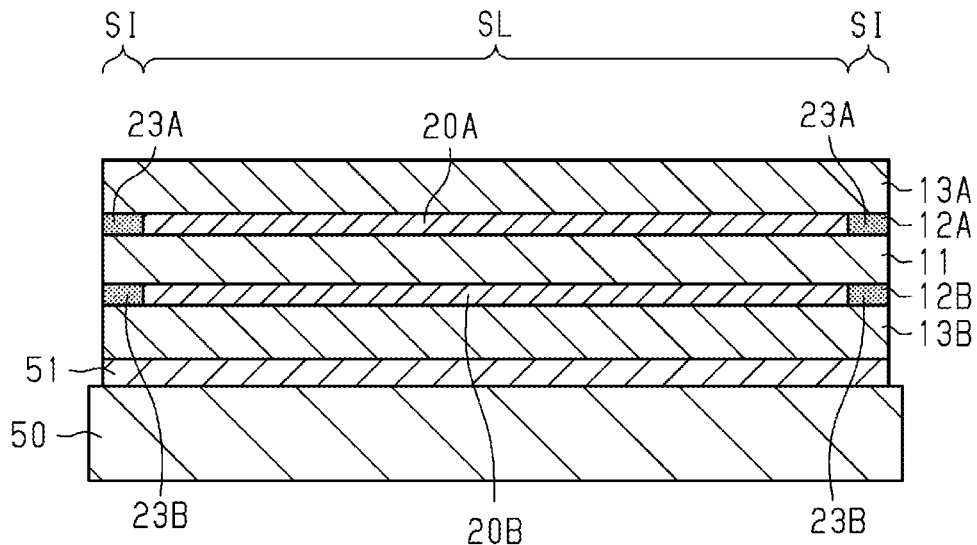
FIG. 22 shows a cross-sectional structure of the light control sheet according to the third embodiment.

A cross-sectional structure of the light control sheet 16 will be described with reference to FIG. 22. FIG. 22 shows a normal-type structure as an example.

The first transparent electrode layer 12A does not have the outer-peripheral conductive section 22A, and is composed of the electrode section 20A and the insulating sections 23A. The second transparent electrode layer 12B does not have the outer-peripheral conductive section 22B, and is composed of the electrode section 20B and the insulating sections 23B. Each of the insulating sections 23A is located at an edge section of the first transparent electrode layer 12A in the surface direction, and each of the insulating sections 23B is located at an edge section of the second transparent electrode layer 12B in the surface direction.

The insulating sections 23A and 23B are sections from which a conductive film has been removed by etching. The insulating sections 23A and 23B may be composed of a material having the same composition as a material of the functional layer such as the light control layer 11 or the alignment layers 14A and 14B in contact with the transparent electrode layers 12A and 12B, or may be sections filled with air. That is, the light control layer 11 is composed of a sandwiched section that is sandwiched between the electrode section 20A and the electrode section 20B and a stretched section that is stretched from the sandwiched section in the surface direction and extends to an edge section of the light control sheet 16. The first transparent electrode layer 12A is composed of the electrode section 20A and each of the insulating sections 23A that extends from the electrode section 20A in the surface direction, and each of the insulating sections 23A and the second transparent electrode layer 12B sandwich the stretched section of the light control layer 11. The second transparent electrode layer 12B is composed of the electrode section 20B and each of the insulating sections 23B that extends from the electrode section 20B in the surface direction, and each of the insulating sections 23B and the first transparent electrode layer 12A sandwich the stretched section of the light control layer 11.

<Method of Producing Light Control Sheet>

A method of producing the light control sheet 16 in the third embodiment will be described using an example of the normal-type light control sheet.

Figure 23:
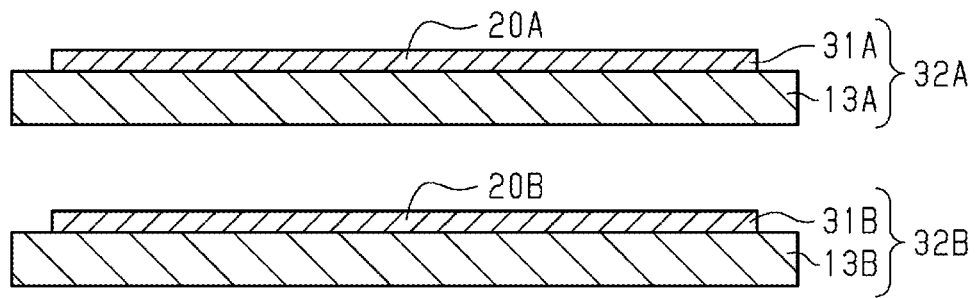
FIG. 23 shows a process of producing the light control sheet according to the third embodiment, and shows transparent conductive layers subjected to etching.

As shown in FIG. 23, first, the first transparent conductive layer 31A formed on the first transparent support layer 13A is subjected to processing such as patterning of a resist mask, and is then etched to remove a section surrounding a region that is to be the electrode section 20A. The second transparent conductive layer 31B formed on the second transparent support layer 13B is etched to remove a section surrounding a region that is to be the electrode section 20B. Materials of the transparent support layers 13A and 13B and the transparent conductive layers 31A and 31B may be the materials described in the first embodiment. The etching may be wet etching or dry etching.

Figure 24:
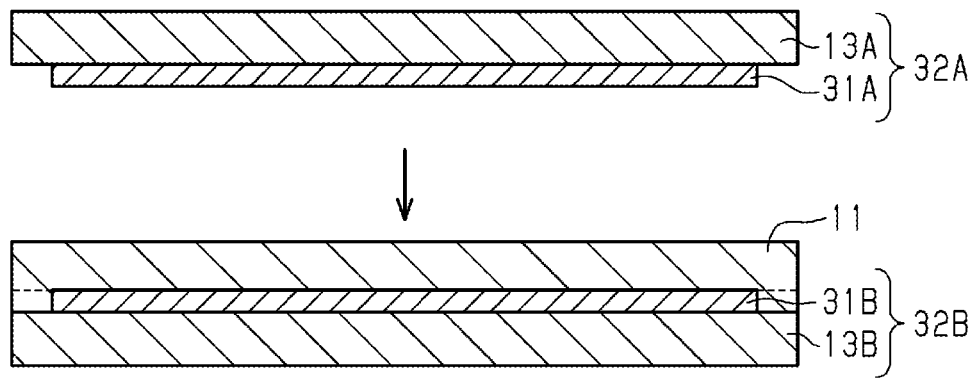
FIG. 24 shows the process of producing the light control sheet according to the third embodiment, and shows a step of laminating the transparent conductive layers subjected to etching.

As shown in FIG. 24, subsequently, the light control layer 11 is formed by coating or the like on the transparent conductive layer of one of laminates, i.e., a first laminate 32A composed of the first transparent support layer 13A and the first transparent conductive layer 31A and a second laminate 32B composed of the second transparent support layer 13B and the second transparent conductive layer 31B. Then, the other laminate is laminated on the light control layer 11 so that the transparent conductive layer is in contact with the light control layer 11. Thus, a laminated structure composed of the light control layer 11, the transparent electrode layers 12A and 12B, and the transparent support layers 13A and 13B is formed. For example, if the region from which the conductive film has been removed by etching is also filled with the same material as the material for forming the light control layer 11, the insulating sections 23A and 23B are composed of a material having the same composition as the material of the light control layer 11.

The connection regions SA and SB may be formed as in the first embodiment after lamination of the first laminate 32A, the light control layer 11, and the second laminate 32B. Alternatively, the connection regions SA and SB may be formed together with lamination of the first laminate 32A, the light control layer 11, and the second laminate 32B, for example, by processing in advance to produce the shapes of the transparent support layers 13A and 13B.

<Effects>

Effects of the third embodiment will be described. In the third embodiment, the insulating sections 23A and 23B also extend along the outer edges of the electrode sections 20A and 20B, respectively. Thus, at the sections at which the insulating sections 23A and 23B are arranged, the electrode sections 20A and 20B are not exposed on the edge surface 10E of the light control sheet 16. This can prevent short circuit and corrosion of the electrode sections 20A and 20B due to adhesion of a conductive material to the edge surface 10E.

In the third embodiment, since the insulating sections 23A and 23B are formed by etching, the insulating sections 23A and 23B are easily formed to have a large width compared with an insulating section formed by laser irradiation. Furthermore, a high degree of freedom is provided to the shape of the region in which the insulating sections 23A and 23B are arranged. Furthermore, in the configuration in which the insulating sections 23A and 23B are filled with a material having the same composition as the material of the functional layer in contact with the transparent electrode layers 12A and 12B, the insulating sections 23A and 23B are prevented from being fragile as in the case where the insulating sections 23A and 23B are formed by laser irradiation. Thus, without the outer-peripheral conductive sections 22A and 22B, the layers constituting the light control sheet 16 are prevented from being separated from each other at the edge section of the light control sheet 16.

As described above, in addition to the effects (1) and (3) of the first embodiment, the third embodiment achieves the following effects.

(9) Since the insulating sections 23A and 23B are formed by etching, the insulating sections 23A and 23B are easily formed to have a large width, and a high degree of freedom is provided to the shape of the region for the insulating sections 23A and 23B. Furthermore, in the configuration in Which the insulating sections 23A and 23B are filled with a material having the same composition as the material of the functional layer in contact with the transparent electrode layers 12A and 12B, even though the outer-peripheral conductive sections 22A and 22B are not provided, the layers constituting the light control sheet 16 are prevented from being removed from each other at the edge section of the light control sheet 16.

<Modifications of Third Embodiment>

The third embodiment can be implemented with modifications as described below. The following modifications may be implemented in combination.

In the third embodiment, the production method has been described in which etching for forming the insulating sections 21A and 21B is performed before lamination of the first laminate 32A, the light control layer 11, and the second laminate 32B. However, if wet etching is used, the etching may be performed after lamination of the layers. Specifically, after the multilayer laminate 30 including the light control layer 11, the transparent support layers 13A and 13B, and the transparent conductive layers 31A and 31B is formed, an edge section of the multilayer laminate 30 is immersed in an etching solution compatible with the material of the transparent conductive layers 31A and 31B. Thus, an edge section of the first transparent conductive layer 31A and an edge section of the second transparent conductive layer 31B are removed, and the first transparent electrode layer 12A having the electrode section 20A and the insulating section 23A, and the second transparent electrode layer 12B having the electrode section 20B and the insulating section 23B are formed.

The surface of the first transparent support layer 13A facing away from the first transparent electrode layer 12A may be bonded to the transparent plate 50, and the surface of the second transparent support layer 13B facing away from the second transparent electrode layer 12B may constitute the surface of the light control sheet 16.

The second transparent electrode layer 12B may not necessarily have the insulating section 23B, and the electrode section 20B may extend to the edge surface 10E of the light control sheet 16. Such a configuration also prevents short circuits due to attachment of a conductive material to the edge surface 10E. Furthermore, in the first transparent electrode layer 12A having the insulating section 23A, corrosion of the electrode section 20A is also prevented.

As in the first embodiment, the first transparent electrode layer 12A may have the outer-peripheral conductive section 22A located outside the insulating section 23A. Furthermore, the second transparent electrode layer 12B may have the outer-peripheral conductive section 22B located outside the insulating section 23B.

As in the second embodiment, the connection regions SA and SB may be arranged at the edge sections of the light control sheet 16, and the insulating region SI may be interrupted in the vicinity of the connection regions SA and SB. For example, the connection regions SA and SB may be located at corner sections of the light control sheet 16, and each of the first connection region SA and the second connection region SB may be protruded from a side of the light control region SL having a substantially rectangular shape. In the vicinity of the first connection region SA, at least the insulating section 23A of the first transparent electrode layer 12A is interrupted. The insulating section 23B of the second transparent electrode layer 12B may be extended uninterrupted. Furthermore, in the vicinity of the second connection region SB, at least the insulating section 23B of the second transparent electrode layer 12B is interrupted. The insulating section 23A of the first transparent electrode layer 12A may be extended without being interrupted.

<Modifications of Embodiments>

The first to third embodiments and modified examples can be implemented with modifications as described below. The following modifications may be implemented in combination.

A part of the light control region SL may extend to the outer edge of the light control sheet. Thus, a part of the electrode sections 20A and 20B may extend to the edge surface 10E of the light control sheet. According to such a configuration, at the sections at which the insulating region SI is located outside the electrode sections 20A and 20B, short circuit and corrosion of the electrode sections 20A and 20B, due to attachment of a conductive material to the edge surface 10E are prevented, compared with a configuration in which no insulating section is provided and the electrode sections 20A and 20B are exposed on the edge surface 10E over the entire perimeter of the light control sheet.

In plan view of the surface of the light control sheet, the region in which the insulating section of the first transparent electrode layer 12A is located may not necessarily be completely match the region in which the insulating section of the second transparent electrode layer 12B is located. Thus, in plan view, the region in which the outer-peripheral conductive section 22A is located may not necessarily be completely match the region in which the outer-peripheral conductive section 22B is located. The electrode section 20A is only required to overlap the electrode section 20B in the region that functions as the light control region SL.

Instead of the conductive adhesive layers 41A and 41B, the leads 42A and 42B, and the solder sections 43A and 43B, the wiring sections 40A and 40B may include conductive adhesive layers such as anisotropic conductive films (ACFs) that are bonded to the surfaces of the transparent electrode layers 12A and 12B, and flexible printed circuits (FPCs) that are bonded to the surfaces of the conductive adhesive layers.

The present application addresses the following. When a conductive material such as water droplets or conductive dust becomes attached to an edge surface of the light control sheet, a short circuit may occur between edge sections of the transparent electrode layers that are exposed on the edge surface.

An aspect of the present invention is to provide a light control sheet capable of preventing short circuits due to contact of a conductive material with an edge surface of the light control sheet, and a method of producing the light control sheet.

A light control sheet for solving the above problem includes a light control layer containing a liquid crystal composition, a first transparent electrode layer and a second transparent electrode layer which are a pair of transparent electrode layers that sandwich the light control layer, and a pair of transparent support layers that sandwich the light control layer and the pair of transparent electrode layers. The first transparent electrode layer has an electrode section to which a driving voltage is applied and an insulating section that is adjacent to the electrode section in a direction along a surface of the light control sheet and extends along an outer edge of the electrode section in plan view of the surface.

According to the above configuration, at the portion at which the insulating section is arranged, the electrode section is not exposed on an edge surface of the light control sheet. This can prevent a short circuit due to attachment of a conductive material to the edge surface. Furthermore, when the electrode section is composed of an oxide semiconductor, corrosion of the electrode section due to attachment of water to the edge surface can also be prevented.

In the light control sheet, the first transparent electrode layer may have a conductive section insulated from the electrode section by the insulating section, the insulating section may be sandwiched between the electrode section and the conductive section in plan view, and the conductive section may be exposed on an edge surface of the light control sheet.

When the insulating section is formed by irradiating a conductive film with a laser so that the electrode section and the conductive section are separated from each other, the insulating section tends to be more brittle than the electrode section and the conductive section. According to the above configuration, as compared with a configuration in which the insulating section is arranged at an edge section of the light control sheet, the layers constituting the light control sheet are prevented from being peeled off from each other at the edge section of the light control sheet.

In the light control sheet, the insulating section may be a laser-processed region.

According to the above configuration, since the insulating section is formed by laser irradiation, as compared with, for example, a production method in which the insulating section is formed by etching, it is possible to reduce the number of steps required to produce the light control sheet.

In the light control sheet, the first transparent electrode layer may include a portion composed of a conductive film, and the conductive film may be broken in the insulating section.

The insulating section having the above configuration can be suitably formed by laser irradiation.

A visible light transmittance of a region in which the insulating section is located in plan view of the light control sheet may be lower than a visible light transmittance of a region in which the electrode section is located in plan view.

The insulating section having the above configuration can be suitably formed by laser irradiation.

In plan view of the light control sheet, a region in which the insulating section is located may be composed of a strip-shaped region having an outer shape formed of a sequence of a plurality of rounded regions arranged in one direction.

The insulating section having the above configuration can be suitably formed by irradiation with a pulsed laser. The use of the pulsed laser allows formation of the insulating section while dissipating heat generated by laser irradiation. This prevents generation of air bubbles in the light control layer.

In plan view of the light control sheet, the insulating section may have an annular shape that surrounds the entire electrode section, and in a region surrounded by the insulating section in plan view, the light control sheet may have a region to which a wiring section for applying a driving voltage to the electrode section is connected.

According to the above configuration, the entire electrode section including the region to which the wiring section is connected is surrounded by the insulating section. Accordingly, the electrode section is not exposed over the entire periphery on the edge surface of the light control sheet; thus, a short circuit of the electrode section is accurately prevented.

The light control sheet may have a connection region to which a wiring section for applying a driving voltage to the electrode section is connected, and in plan view, the connection region may be located at an edge section of the light control sheet, and the insulating section may be interrupted in the vicinity of the connection region.

The above configuration can improve the ease of forming the connection region and connecting the wiring section to the connection region while preventing a short circuit of the electrode section at the portion at which the insulating section is located.

In the light control sheet, the second transparent electrode layer may have an electrode section to which a driving voltage is applied and an insulating section that is adjacent to the electrode section in the direction along the surface of the light control sheet and extends along an outer edge of the electrode section in plan view, and the insulating section of the first transparent electrode layer may overlap the insulating section of the second transparent electrode layer in plan view.

According to the above configuration, the electrode section is not exposed on the edge surface of the light control sheet at the portion at which the insulating section of the first transparent electrode layer overlaps the insulating section of the second transparent electrode layer, in both the first transparent electrode layer and the second transparent electrode layer. Thus, a short circuit due to attachment of a conductive material to the edge surface is more reliably prevented. Furthermore, when the electrode section is composed of an oxide semiconductor, corrosion of the electrode section due to attachment of water to the edge surface can be prevented in both the first transparent electrode layer and the second transparent electrode layer. According to the configuration in which the insulating section of the first transparent electrode layer overlaps the insulating section of the second transparent electrode layer, when the insulating sections are formed by laser irradiation, the insulating sections can be collectively formed; thus, the insulating sections can be formed with high efficiency.

A method of producing a light control sheet includes: forming a multilayer laminate in which a light control layer containing a liquid crystal composition is sandwiched between a first transparent conductive layer supported by a first transparent support layer and a second transparent conductive layer supported by a second transparent support layer; and forming an insulating section in the first transparent conductive layer by laser irradiation to the multilayer laminate, thereby forming a layer having an electrode section to which a driving voltage is configured to be applied and the insulating section extending along an outer edge of the electrode section.

According to the above production method, at the portion at which the insulating section is arranged, the electrode section is not exposed on the edge surface of the light control sheet. This can prevent a short circuit due to attachment of a conductive material to the edge surface. Furthermore, when the electrode section is composed of an oxide semiconductor, corrosion of the electrode section due to attachment of water to the edge surface can also be prevented. Furthermore, since the insulating section is formed by laser irradiation, for example, as compared with the production method in which the insulating section is formed by etching, it is possible to reduce the number of steps required to produce the light control sheet. Furthermore, since the insulating section is formed after the multilayer laminate is formed, it is possible to easily cope with design change in the shape of the light control sheet, the shape of the electrode section, and the like.

The embodiments of the present invention can prevent a short circuit due to attachment of a conductive material to an edge surface of the light control sheet.

REFERENCE SIGNS LIST

La . . . Laser
Cs, Ss . . . Strip-shaped region
SA, SB . . . Connection region
SI . . . Insulating region
SL . . . Light control region
SO . . . Conductive region
10, 10N, 10R, 15, 16 . . . Light control sheet
11 . . . Light control layer
12A, 12B . . . Transparent electrode layer
13A, 13B . . . Transparent support layer
14A, 14B . . . Alignment layer
20A, 20B . . . Electrode section
21A, 21B, 23A, 23B . . . Insulating section
22A, 22B . . . Outer-peripheral conductive section
30 . . . Multilayer laminate
31A, 31B . . . Transparent conductive layer
40A, 40B . . . Wiring section
41A, 41B . . . Conductive adhesive layer
42A, 42B . . . Solder section
43A, 43B . . . Lead
50 . . . Transparent plate
51 . . . Transparent adhesive layer
60 . . . Laser device Obviously, numerous modifications and variations of the present invention are possible in light of the above teachings. It is therefore to be understood that within the scope of the appended claims, the invention may be practiced otherwise than as specifically described herein.

What is claimed is:
1. A light control sheet, comprising:
a light control layer including a liquid crystal composition;
a pair of transparent electrode layers including a first transparent electrode layer and a second transparent electrode layer sandwiching the light control layer; and
a pair of transparent support layers sandwiching the light control layer and the pair of transparent electrode layers,
wherein the pair of transparent electrodelayers is formed such that the first transparent electrode layer faces a first surface of the light control layer and that the second transparent electrode layer faces a second surface of the light control layer on an opposite side with respect to the first surface, and each of the first and second transparent electrode layers has an electrode section comprising an electrode material and configured to apply a driving voltage to the light control layer, an insulating section comprising a laser-processed portion of the electrode material, formed adjacent to the electrode section and extending along an outer edge of the electrode section, and an outer-peripheral conductive section comprising the electrode material, formed adjacent to the insulating section and extending along an outer edge of the insulating section such that the outer-peripheral conductive section is insulated from the electrode section by the insulating section and that no voltage is applied to the outer-peripheral conductive section.

2. The light control sheet according to claim I, wherein the outer-peripheral conductive section is formed such that the outer-peripheral conductive section has an annular shape that surrounds the outer edge of the insulating section entirely.

3. The light control sheet according to claim 1, wherein the insulating section is the laser-processed portion comprising a fragmented portion of the electrode material.

4. The light control sheet according to claim 3, wherein each of the first and second transparent electrode layers comprises a conductive film including the fragmented portion forming the insulating section.

5. The light control sheet according to claim 3, wherein the insulating section and the electrode section are formed such that a visible light transmittance in the insulating section is lower than a visible light transmittance in the electrode section.

6. The light control sheet according to claim 3, wherein the insulating section is a strip-shaped region having an outer shape formed by a sequence of a plurality of rounded regions formed in one direction.

7. The light control sheet according to claim 1, wherein the insulating section has an annular shape that surrounds the electrode section entirely, the outer-peripheral conductive section has an annular shape that surrounds the outer edge of the insulating section entirely, and the light control sheet has a connection region to which a wiring section configured to apply the driving voltage to the electrode section is to be connected such that the wiring section is surrounded by the insulating section when connected to the connection region.

8. The light control sheet according to claim 1, wherein the light control sheet has a connection region to which a wiring section configured to apply the driving voltage to the electrode section is to be connected such that the connection region is formed in an end portion of the light control sheet and that the insulating section is disconnected in a vicinity of the connection region.

9. The light control sheet according to claim 2, wherein the insulating section is the laser-processed portion of the first transparent electrode layer.

10. The light control sheet according to claim 1, wherein the pair of transparent electrode layers is formed such that the first transparent electrode layer is formed on and in contact with the first surface of the light control layer and that the second transparent electrode layer formed on and in contact with the second surface of the light control layer.

11. The light control sheet according to claim 1, further comprising:
a pair of alignment layers including a first alignment layer formed on the first surface of the light control layer and a second alignment layer formed on the second surface of the light control layer,
wherein the pair of transparent electrode layers is formed such that the first transparent electrodelayer is formed on the first alignment layer and that the second transparent electrode layer formed on the second alignment layer.

12. The light control sheet according to claim 10, wherein the outer-peripheral conductive section is formed such that the outer-peripheral conductive section has an annular shape that surrounds the outer edge of the insulating section entirely.

13. The light control sheet according to claim 11, wherein the outer-peripheral conductive section is formed such that the outer-peripheral conductive section has an annular shape that surrounds the outer edge of the insulating section entirely.

14. The light control sheet according to claim 10, wherein the insulating section is the laser-processed portion comprising a fragmented portion of the electrode material.

15. The light control sheet according to claim 11, wherein the insulating section is the laser-processed portion comprising a fragmented portion of the electrode material.

16. The light control sheet according to claim 14, wherein each of the first and second transparent electrode layers comprises a conductive film including the fragmented portion forming the insulating section.

17. The light control sheet according to claim 15, wherein each of the first and second transparent electrode layers comprises a conductive film including the fragmented portion forming the insulating section.

18. The light control sheet according to claim 14, wherein the insulating section and the electrode section are formed such that a visible light transmittance in the insulating section is lower than a visible light transmittance in the electrode section.

19. The light control sheet according to claim 15, wherein the insulating section and the electrode section are formed such that a visible light transmittance in the insulating section is lower than a visible light transmittance in the electrode section.

20. A method of producing a light control sheet, comprising:
forming a multilayer laminate in which a light control layer including a liquid crystal composition is sandwiched between a first transparent conductive layer supported by a first transparent support layer and a second transparent conductive layer supported by a second transparent support layer; and
forming an insulating section in each of the first and second transparent conductive layers by laser irradiation to the multilayer laminate such that each of the first and second transparent conductive layers has an electrode section comprising an electrode material and configured to apply a driving voltage to the light control layer, the insulating section comprising a laser-processed portion of the electrode material, formed adjacent to the electrode section and extending along an outer edge of the electrode section, and an outer-peripheral conductive section comprising the electrode material, formed adjacent to the insulating section and extending along an outer edge of the insulating section such that the outer-peripheral conductive section is insulated from the electrode section by the insulating section and that no voltage is applied to the outer-peripheral conductive section,
wherein the multilayer laminate is formed such that the first transparent conductive layer forms a first transparent electrode layer facing a first surface of the light control layer and that the second transparent conductive layer forms a second transparent electrode layer facing a second surface of the light control layer on an opposite side with respect to the first surface.

* * * * *